(12) United States Patent
Prehogan et al.

(10) Patent No.: US 11,917,980 B2
(45) Date of Patent: Mar. 5, 2024

(54) COLLAPSIBLE ANIMAL CONTAINMENT ASSEMBLY

(71) Applicant: DIGGS INC., Brooklyn, NY (US)

(72) Inventors: Jacqueline Prehogan, Toronto (CA); Isaac Langleben, Toronto (CA); Zel Alexander Crampton, Brooklyn, NY (US); Benjamin J. Beck, Long Island City, NY (US); Michael T. McDuffee, Malden, MA (US); Ryan J. Donovan, Newton, MA (US); Douglas A. Marsden, Marblehead, MA (US)

(73) Assignee: Diggs Inc., Long Island City, NY (US)

( * ) Notice: Subject to any disclaimer, the term of this patent is extended or adjusted under 35 U.S.C. 154(b) by 450 days.

(21) Appl. No.: 16/494,141

(22) PCT Filed: Mar. 1, 2018

(86) PCT No.: PCT/US2018/020411
§ 371 (c)(1),
(2) Date: Sep. 13, 2019

(87) PCT Pub. No.: WO2018/169693
PCT Pub. Date: Sep. 20, 2018

(65) Prior Publication Data
US 2021/0120778 A1    Apr. 29, 2021

Related U.S. Application Data

(60) Provisional application No. 62/470,389, filed on Mar. 13, 2017.

(51) Int. Cl.
*A01K 1/02* (2006.01)
*A01K 1/03* (2006.01)

(52) U.S. Cl.
CPC ............ *A01K 1/0245* (2013.01); *A01K 1/033* (2013.01)

(58) Field of Classification Search
CPC .... A01K 1/0245; A01K 1/0236; A01K 1/033; A01K 1/034
See application file for complete search history.

(56) References Cited

U.S. PATENT DOCUMENTS 2,538,778 A * 1/1951 Halpin ................. A01K 1/0245
119/497
4,484,540 A    11/1984 Yamamoto
(Continued)

OTHER PUBLICATIONS

Diggspet, "Initial Diggs Crate Design", YouTube, Retrived From Internet, URL: www.youtube.com/watch?v=v-VHFyMPIZA, Dec. 20, 2017.
(Continued)

*Primary Examiner* — Tien Q Dinh
*Assistant Examiner* — Katelyn T Truong
(74) *Attorney, Agent, or Firm* — Kilpatrick Townsend & Stockton LLP

(57) ABSTRACT

A collapsible pet crate that is easy to operate, aesthetically pleasing, quiet, light, durable, easy to clean, and safe and comfortable for the animal. Also disclosed herein are methods of operating a collapsible pet crate. The collapsible pet crate disclosed herein can further include one-step operation, environmentally safe and pet-friendly materials, and method to include various pet-friendly accessories.

17 Claims, 17 Drawing Sheets

(56) References Cited

U.S. PATENT DOCUMENTS

| | | | | |
|---|---|---|---|---|
| 4,590,885 A * | 5/1986 | Sugiura | A01K 1/0245 | 119/497 |
| 5,071,176 A * | 12/1991 | Smith | A01K 1/0236 | 292/7 |
| 5,307,758 A * | 5/1994 | Ho | A01K 1/0356 | 119/497 |
| 5,549,073 A * | 8/1996 | Askins | A01K 1/032 | 119/461 |
| 5,626,098 A | 5/1997 | Askins et al. | | |
| 5,803,018 A * | 9/1998 | Liou | A01K 31/08 | 119/461 |
| 5,967,090 A * | 10/1999 | Hui | A01K 1/0245 | 119/453 |
| 6,783,162 B1 | 8/2004 | Harper | | |
| 6,863,030 B2 * | 3/2005 | Axelrod | A01K 1/0245 | 119/498 |
| 7,021,242 B2 * | 4/2006 | Axelrod | A01K 1/0245 | 119/496 |
| 8,127,719 B2 * | 3/2012 | Jakubowski | A01K 1/03 | 119/499 |
| 11,039,596 B2 * | 6/2021 | Pan | A01K 1/0245 | |
| 2005/0229866 A1 | 10/2005 | Simpson et al. | | |
| 2007/0000447 A1 * | 1/2007 | Jakubowski | A01K 31/08 | 119/453 |
| 2008/0121188 A1 * | 5/2008 | Axelrod | A01K 1/033 | 119/499 |
| 2008/0245313 A1 | 10/2008 | Jakubowski et al. | | |
| 2010/0089336 A1 | 4/2010 | Flannery et al. | | |
| 2011/0041774 A1 * | 2/2011 | Northrop | A01K 1/0245 | 119/497 |
| 2012/0234252 A1 * | 9/2012 | Donta | A01K 1/0125 | 119/168 |
| 2014/0352628 A1 * | 12/2014 | Kellogg | A01K 1/03 | 119/498 |
| 2017/0118947 A1 * | 5/2017 | Thoma | A01K 1/0245 | |

OTHER PUBLICATIONS

PCT/US2018/020411, "International Search Report and Written Opinion", dated May 29, 2018, 11 pages.

PCT/US2018/020411, "International Preliminary Report on Patentability", dated Sep. 26, 2019, 9 pages.

* cited by examiner

COLLAPSIBLE ANIMAL CONTAINMENT ASSEMBLY

CROSS-REFERENCE TO RELATED APPLICATIONS

The present application is a U.S. national phase application under 35 U.S.C. § 371 of PCT/US2018/020411, filed on Mar. 1, 2018, which claims the benefit of priority to U.S. Provisional Application No. 62/470,389, filed on Mar. 13, 2017, the entire contents of each of which are incorporated by reference herein for all purposes.

TECHNICAL FIELD

The present disclosure relates to the pet industry generally and more specifically to pet crates.

BACKGROUND

Conventional enclosures or crates for pets are often heavy, difficult to operate, rattling, constructed from cheap materials, and unattractive. In addition to not being user-friendly, conventional pet enclosures are often disadvantageous for the pet because they may be difficult to clean and thus left dirty. Further access to the interior may be difficult. It can be desirable to produce a collapsible pet crate that is easy to operate, aesthetically pleasing, quiet, light, durable, easy to clean, and safe and comfortable for the animal.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. According to certain embodiments of the present invention, disclosed herein is a collapsible crate assembly, comprising: a support frame for supporting a mesh network in a deployed position, having a bottom, a top, a first collapsible vertical member, a second collapsible vertical member, a third collapsible vertical member and a fourth collapsible vertical member; a front side comprising the first vertical member and the second vertical member and a first horizontal top member and a mesh network disposed between the first vertical member and the second vertical member and the first horizontal top member; a rear side comprising the third vertical member and the fourth vertical member and a second horizontal top member, and a mesh network disposed between the third vertical member and the fourth vertical member and the second horizontal top member; a first side comprising the first vertical member and the fourth vertical member and a collapsible mesh network disposed between the first vertical member and the fourth vertical member; a second side comprising the second vertical member and the third vertical member and a collapsible mesh network disposed between the second vertical member and the third vertical member; the bottom, further comprising a rectangular solid panel, having the first collapsible vertical member extending from a first corner, the second collapsible vertical member extending from a second corner, the third collapsible vertical member extending from a third corner, and the fourth collapsible vertical member extending from a fourth corner, the top, further comprising a first horizontal member disposed at a midpoint between the first side and the second side and extending longitudinally from the front to the rear, further comprising a first side horizontal member that can be disposed above the first side and a second side horizontal member that can be disposed above the second side, and, having a mesh network disposed between the first horizontal member and the first side horizontal member and a mesh network disposed between the first horizontal member and the second side horizontal member.

BRIEF DESCRIPTION OF THE DRAWINGS

The specification makes reference to the following appended figures, in which use of like reference numerals in different figures is intended to illustrate like or analogous components.

DETAILED DESCRIPTION

Certain aspects and features of the present disclosure relate to pet containment. The embodiments of the present disclosure described below are not intended to be exhaustive or to limit the disclosure to the precise forms described herein. Rather, the embodiments described herein are chosen so that a person of skill in the art can appreciate and understand the principles and practices of the present disclosure.

As used herein, directional and spatial terms such as "horizontal," "vertical," "horizontally," "vertically," and "upward" are not intended to be binding terms.

Figure 1A:
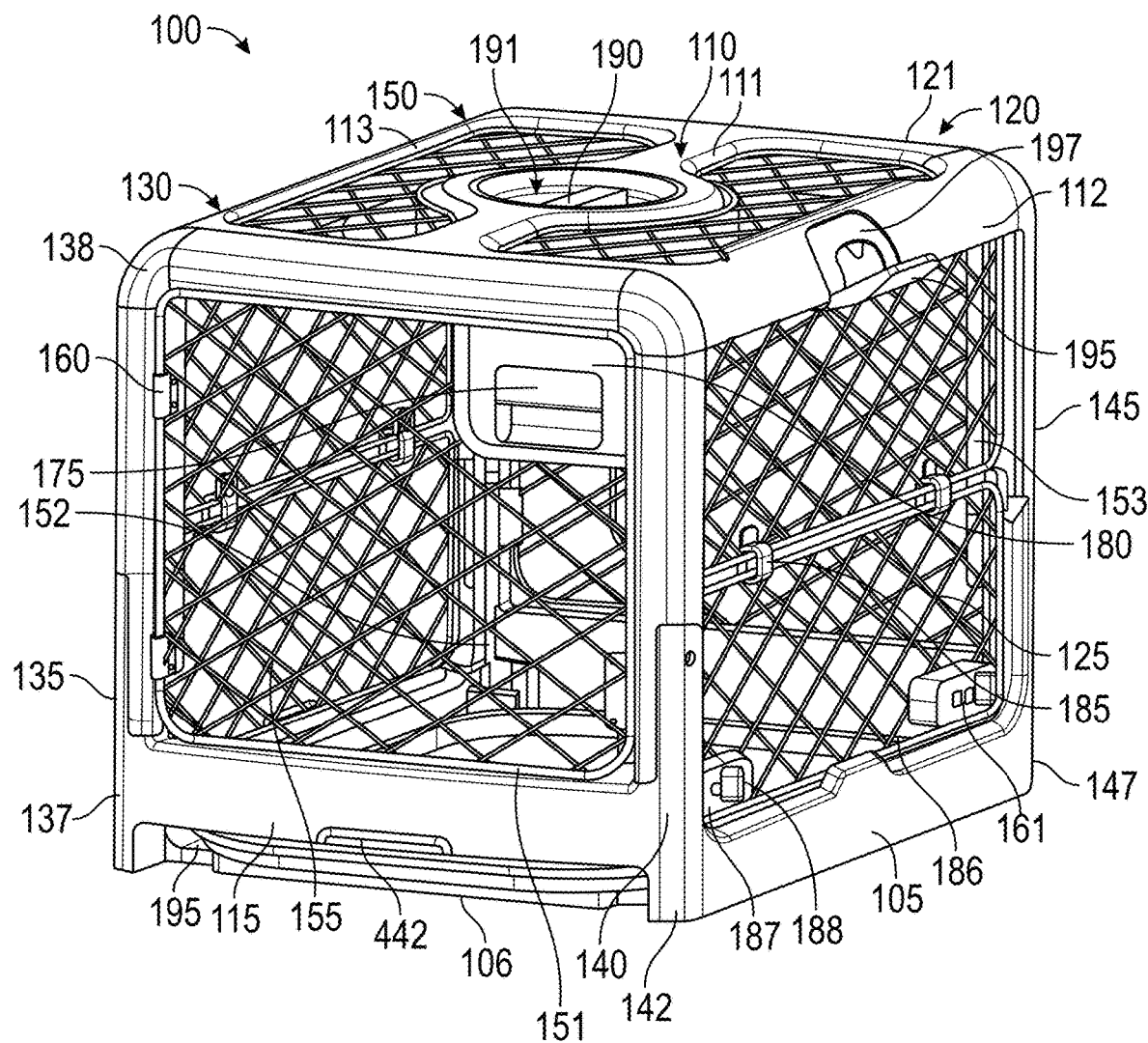
FIG. 1A is a front top perspective view of a collapsible crate assembly according to certain aspects of the present disclosure.

A representative embodiment is presented in FIG. 1A. In some embodiments, a collapsible crate assembly 100 comprises a bottom 105, a top 110, a front 115, a rear 120, a first side 125 and a second side 130. A support frame is defined by four vertical members extending upward from the bottom 105, including a first collapsible vertical member 135, a second collapsible vertical member 140, a third collapsible vertical member 145 and a fourth collapsible vertical member 150. The support frame is employed to support a mesh network 155 forming an enclosure of the collapsible crate assembly 100. The mesh network 155 may include diamond shaped openings, (FIGS. 1A, 6, 7C), rounded openings (FIGS. 4A, 5, 7A, 7B), rectangular openings (FIGS. 1B-3), or any other appropriate shape. The collapsible crate assembly 100 may include as many as six doors/openings.

Figure 10:
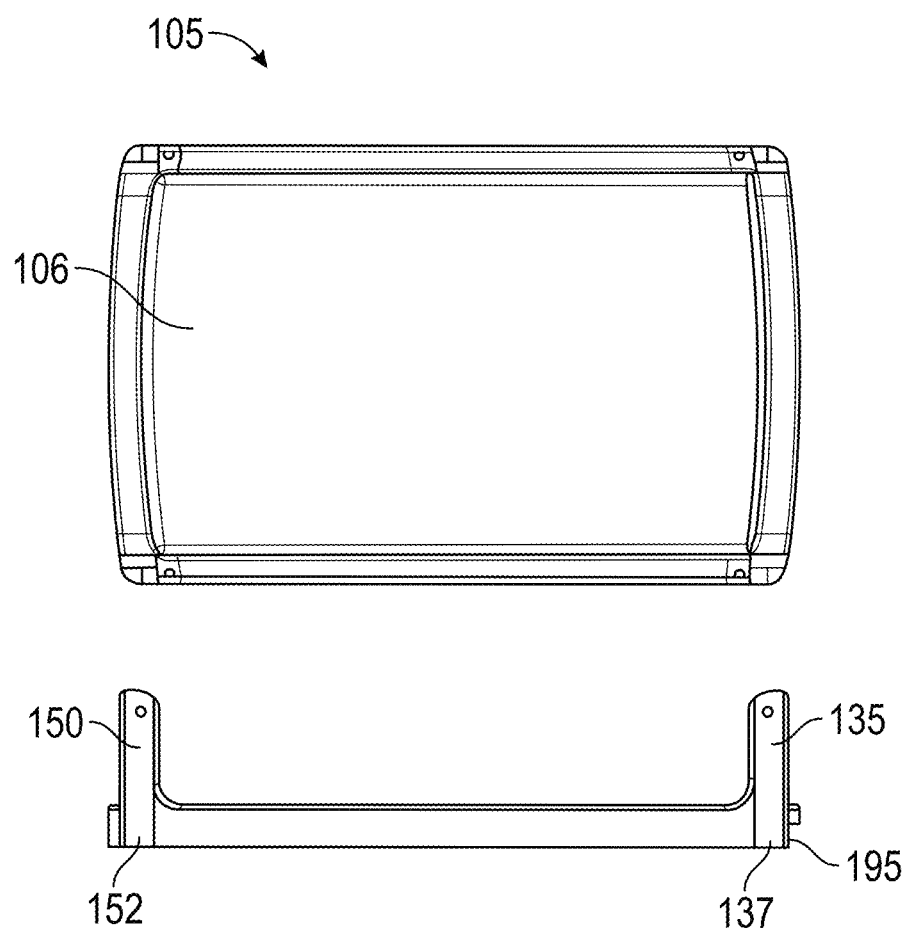
FIG. 10 is a schematic of a bottom part of the collapsible crate assembly of FIG. 1A according to an embodiment described herein.

The bottom 105 (see FIG. 10) can include a panel 106 for contact with a floor, a ground or any suitable surface such that the panel 106 is below the tray 450. In some non-limiting examples, the panel 106 may include a plurality of holes while in other embodiments, the panel 106 is a solid panel. Providing the collapsible crate assembly 100 with the bottom 105 having a porous panel 106 with holes reduces weight and manufacturing costs of the crate assembly 100. In some cases, the bottom 105 can further include feet for contacting the ground or any suitable surface. For example, the bottom 105 can include polymer feet (e.g., natural rubber feet, polystyrene feet, synthetic rubber feet, any suitable polymer material, or any combination thereof), silicon-based feet (e.g., silicone, polysilicon, or any suitable silicon-based material), or any suitable material feet. Feet can be in incorporated onto the bottom 105 to prevent scratching when placed on the ground or any suitable surface, reduce noise created by an active animal, and reduce shock and/or stresses applied to the crate by the active animal. The bottom 105 forms a basis for a support structure of the collapsible crate assembly 100, having a first collapsible vertical member 135 extending from a first corner 137, a second collapsible vertical member 140 extending from a second corner 142, a front top horizontal member 138 joining the first collapsible vertical member 135 and the second collapsible vertical member 140, a third collapsible vertical member 145 extending from a third corner 147, a fourth collapsible vertical member 150 extending from a fourth corner 152 and a rear top horizontal member 121 joining the third collapsible vertical member 145 and the fourth collapsible vertical member 150. In some embodiments, at least a portion of each of the collapsible vertical members (135, 140, 145, 150) is integral with the panel 106 while in other embodiments, each of the collapsible vertical members (135, 140, 145, 150) is a separate component that is attached to the solid panel 106. A tray slot 195 can be disposed within the front 115 between the first corner 137 and the second corner 142, the rear 120 between the third corner 147 and the fourth corner 152, the first side 125 between the second corner 142 and the third corner 147, or the second side 130 between the fourth corner 152 and the first corner 137. A tray 450 (see FIGS. 4 and 7A) can be disposed above the panel 106 for cleaning and/or animal byproduct removal. The tray 450 can be extracted through the tray slot 195. The tray 450 can be reinserted through the tray slot 195.

The tray 450 can have any suitable design such that when inserted into the collapsible crate assembly 100 the tray 450 can cover an interior of the bottom 105 and prevent spillage of water, food, and/or animal byproduct. For example, the tray 450 can have a same shape as the bottom 105 (e.g., a rectangular bottom 105 can employ a rectangular tray 450, an elliptical bottom 105 can employ an elliptical tray 450, and the like). In some non-limiting examples, the tray 450 can have a lip 710 extending upward (see FIG. 7A). The lip 710 can extend vertically upward from a bottom of the tray 450. In some cases, the lip 710 can extend upward at an angle other than vertical from the tray 450. In some aspects, the lip 710 can extend upward from the tray 450 at an angle from about 90° to approximately 30°. For example, the lip 710 can extend upward from the tray 450 at an angle of 90°, 75°, 60°, 45°, 30°, or other appropriate angle.

In some non-limiting examples, the bottom 105 can include a locking mechanism to secure the tray 450 into place when in service beneath an animal contained within the collapsible crate assembly 100. In some embodiments, the locking mechanism can be an indentation or notch (not shown) disposed within a portion of the bottom 105 and a corresponding protrusion (not shown) disposed in the tray 450 such that when the tray 450 is fully inserted, the protrusion can engage the indentation thus locking the tray 450 in the collapsible crate assembly 100. The protrusion may be a static component, a ball spring, a spring pin, a barb, or any other appropriate structure. Applying a force to the tray 450 can disengage the protrusion from the indentation enabling removal of the tray 450 from the collapsible crate assembly 100. The force required to enable removal of the tray 450 from the collapsible crate assembly 100 can be greater than a force an animal contained within the collapsible crate assembly 100 can apply to the tray 450 from within the collapsible crate assembly 100, providing a safe enclosure for the animal (e.g., the animal may not enable the tray 450 to slide out of the collapsible crate assembly 100).

Figure 9:
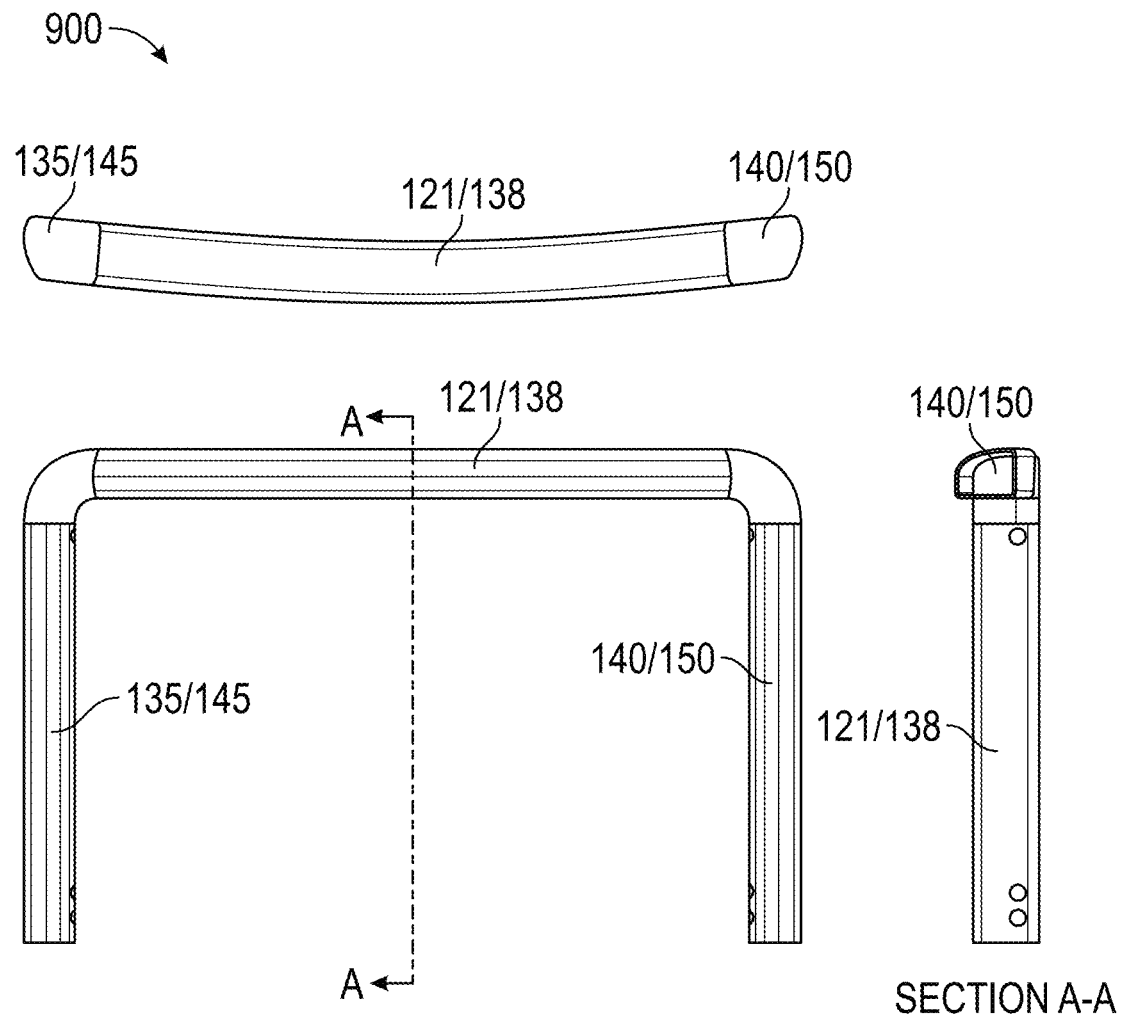
FIG. 9 is a schematic of a front or rear part of the collapsible crate assembly of FIG. 1A according to an embodiment described herein.

The front 115 comprises the first collapsible vertical member 135 and the second collapsible member 140 and a front top horizontal member 138. In some embodiments, the first collapsible vertical member 135 and the second collapsible member 140 and the front top horizontal member 138 can be a single extruded part 900 (see FIG. 9). The rear 120 comprises the third collapsible vertical member 145 and the fourth vertical member 150 and a rear top horizontal member 121. The third collapsible vertical member 145 and the fourth vertical member 150 and the rear top horizontal member 121 can be a single extruded part 900 (see FIG. 9). The mesh network 155 disposed between the first collapsible vertical member 135 and the second collapsible vertical member 140 and the front top horizontal member 138 is a front door 151. Optionally, the mesh network 155 disposed between the third collapsible vertical member 145 and the fourth collapsible vertical member 150 and the rear top horizontal member 121 can be a rear door 153. The front door 151 can attach to the first collapsible vertical member 135 or the second collapsible vertical member 140 with hinges 160 forming a horizontally opening front door 151. The optional rear door 153 can attach to the third collapsible vertical member 145 or the fourth collapsible vertical member 150 with hinges 160 forming a horizontally opening rear door 153. Optionally, the front door 151 can attach to the front top horizontal member 138 with hinges 160 forming an upward opening front door 151. In some cases, the optional rear door 153 can attach to the rear top horizontal member 121 with hinges 160 forming an upward opening optional rear door 153.

The front and rear doors can have latch pins (not shown) disposed on a side opposite the hinges 160 (e.g., hinges 160 can be attached to the first collapsible vertical member 135 and the latch pins can be disposed adjacent to the second collapsible vertical member 140), such that the latch pins can engage latch pin receivers (not visible) disposed on the first collapsible vertical member 135, the second collapsible vertical member 140, the third collapsible vertical member 145 or the fourth collapsible vertical member 150; a latch pin release mechanism 175, wherein the latch pin release mechanism 175 is disposed within a housing 180 making it accessible to a human user outside of the crate assembly 100 and inaccessible to an animal contained within the crate assembly 100 when the crate assembly 100 is in a deployed position. The latch pin release mechanism 175 is spring loaded such that the latch pins are normally engaged in the latch pin receivers. The latch pin release mechanism 175 must be depressed to disengage the latch pins from the latch pin receivers allowing the front door and rear door to be opened and allowing an animal to enter and/or exit the crate assembly 100.

Figure 11A:
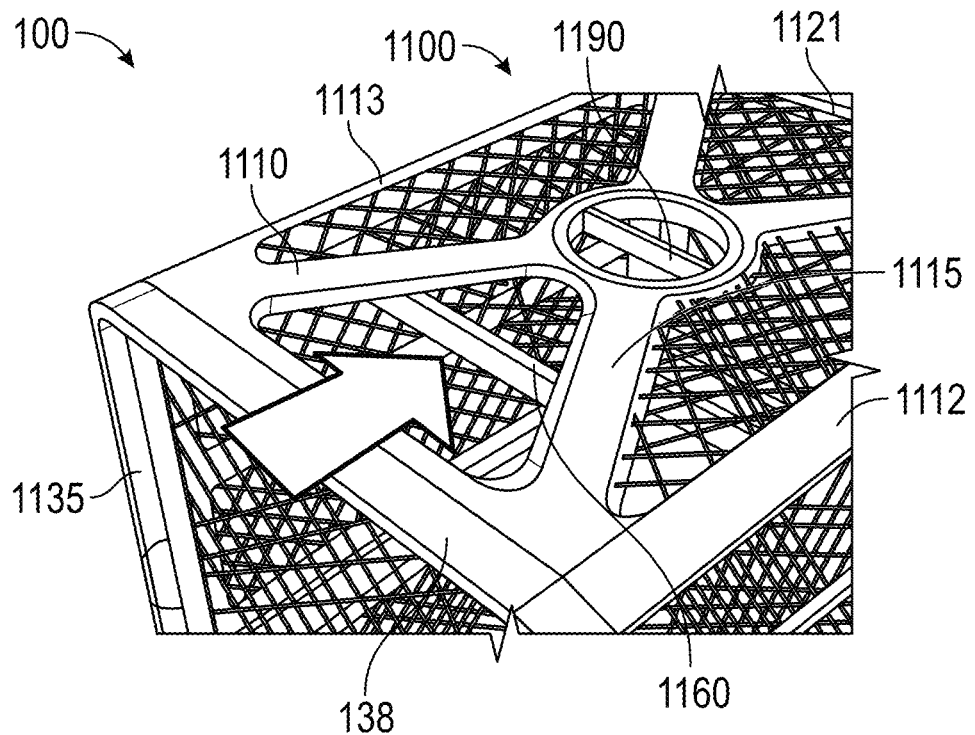
FIG. 11A is a top perspective view of a collapsible crate assembly according to an embodiment described herein.
Figure 11B:
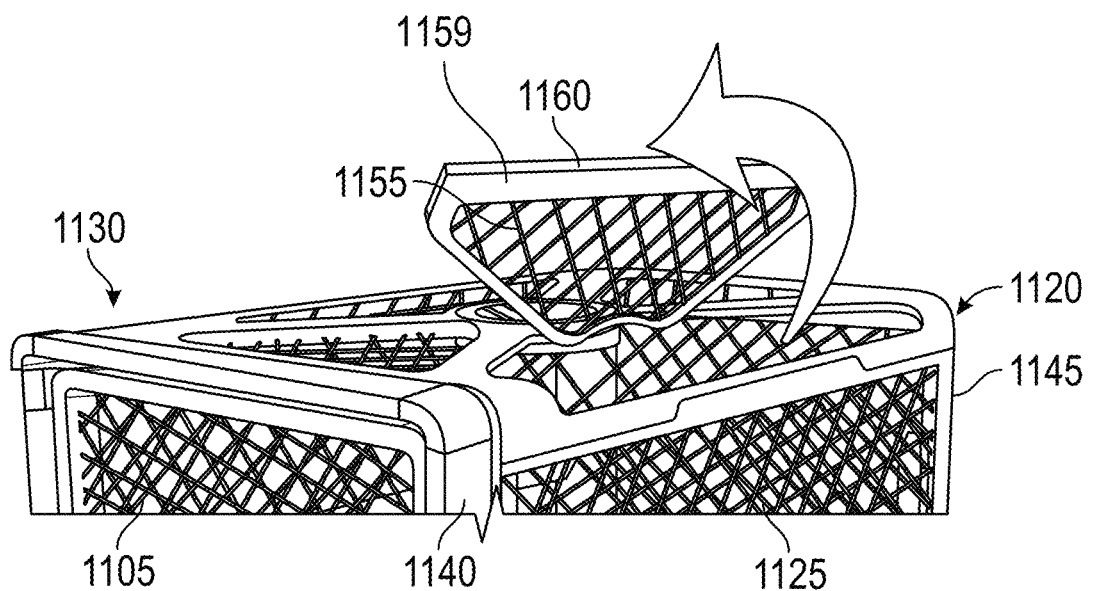
FIG. 11B is a top perspective view of a collapsible crate assembly according to an embodiment described herein.
Figure 11C:
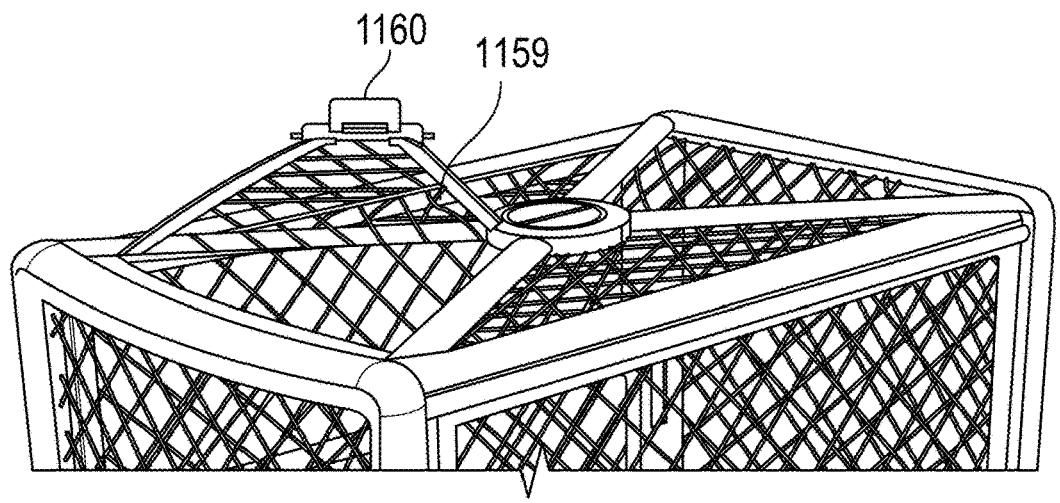
FIG. 11C is a top perspective view of a collapsible crate assembly according to an embodiment described herein.
Figure 11D:
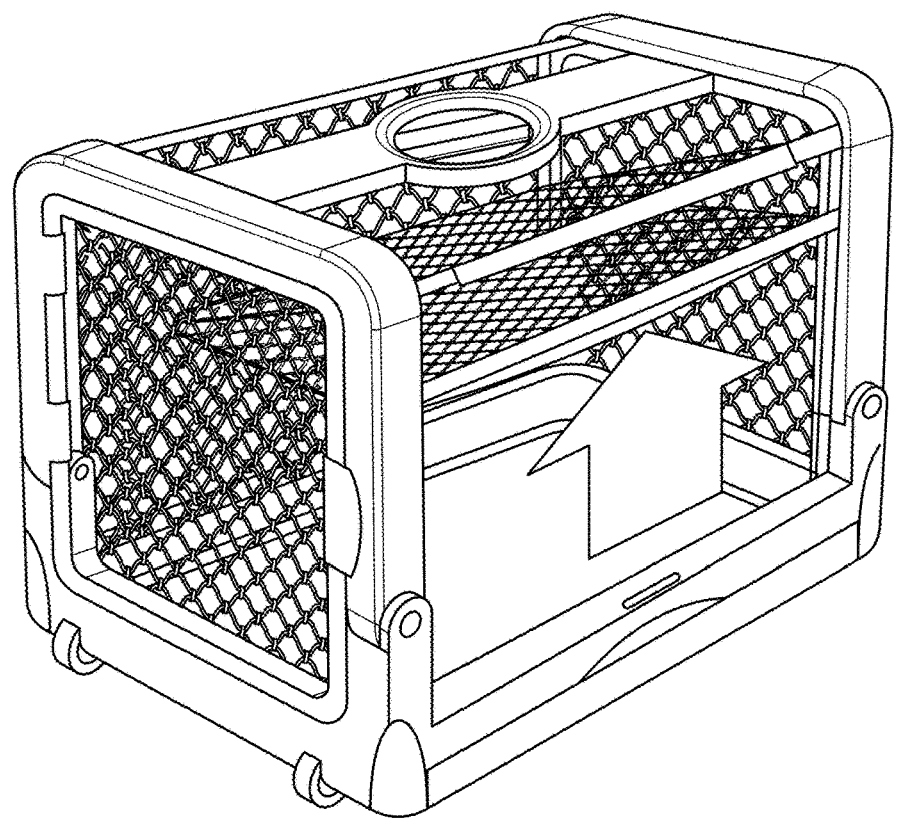
FIG. 11D is a top perspective view of a collapsible crate assembly according to an embodiment described herein.

The mesh network 155 disposed between the second collapsible vertical member 140 and the third collapsible vertical member 145 is a first side door. The mesh network 155 disposed between the fourth collapsible vertical member 150 and the first collapsible vertical member 135 is a second side door. The first side door and the second side door attach to a first horizontal side member 112 of the top 110 and the second side door can attach to a second horizontal side member 113 of the top 110 providing a hinged opening first side door and/or a hinged opening second side door. The first side door and/or the second side door may include hinges 185. For example, the first side door may include one or more hinges 185 disposed along a horizontal member located approximately halfway between bottom 105 and horizontal side member 112. The hinge(s) 185 may function such that the first and second doors bifold when the crate assembly 100 moves from the deployed position (see FIG. 1A) into the collapsed position (see FIG. 4). In some embodiments, the hinges 185 function as a one-way hinge such that the hinges 185 and center portion of the door move toward the interior of the crate assembly 100 as shown in FIG. 11D (i.e., the hinges 185 prevent the respective door from pivoting outward). In addition, hinges 185 are configured such that an upper and/or lower portion of the first side door (and/or second side door) can pivot to create an opening for access to the interior of the collapsible crate assembly 100 (see FIG. 11D). In some embodiments, the lower half of the first door may pivot about hinges 185 to an open position to allow a pet to move into or out of the collapsible crate assembly 100 or the upper half of the first door may pivot about hinges 185 to an open position to allow access to the interior (while limiting the chance of the pet exiting the collapsible crate assembly 100). In some embodiments, the first and/or second doors are configured such that the upper and lower halves are both movable.

In some examples, latch pins 186 (see FIG. 2) are disposed on a at least a portion of a bottom side of the first side door and on at least a portion of a bottom side of the second side door each extending longitudinally such that the first side door and/or the second side door can be secured when the crate assembly 100 is in the deployed position and and/or in the collapsed position. Latch pins 186 are disposed on at least a portion of a bottom side of the first side door (and/or the second side door). The latch pins 186 may be disposed on at least a portion of a bottom side of the first side door (and/or the second side door) such that the each pin engages the respective vertical member (135, 140, 145, 150) in one or more locations. For example, the latch pins 186 may engage the vertical members to secure side door in a closed position (see FIG. 1A), an open or partially open position (see FIG. 11D), or an intermediate position. In some embodiments, in the open position, the panels of the side door are approximately parallel with the ceiling and/or floor of the crate assembly 100. In some embodiments, at least one of the side doors includes a magnet for holding the door in the open position (i.e., folded or bifolded position as shown in FIG. 11D). Guide housings 187 may be disposed on at least a portion of a bottom side of the first side door and the second side door in close proximity to the first collapsible vertical member 135, the second collapsible vertical member 140, the third collapsible vertical member 145 and the fourth collapsible vertical member 150, such that the latch pins 186 can be guided into latch pin receiving slots (not visible) disposed in the respective vertical member. The latch pins 186 may be disposed within the guide housings 187 and extend longitudinally through the guide housings 187. The latch pin operation actuators 188 may protrude from the guide housings 187, and connect to terminal ends of the latch pins 186 such that the latch pins 186 can be extended into or retracted from the latch pin receiving slots 250 (see FIG. 2) disposed in the respective vertical member. Movement of the latch pins 186 (via the latch pin operation actuators 188) may release the first side door and/or the second side door to provide an opening for an animal contained within the collapsible crate assembly 100. The latch pin operation actuators 188 may include a spring mechanism such that the latch pins 186 are normally engaged within the latch pin receiving slots disposed in the respective vertical member. Movement of the latch pin operation actuators 188 to compress the spring mechanism may disengage the latch pins 186 from the latch pin receiving slots disposed in the respective vertical member.

Figure 1B:
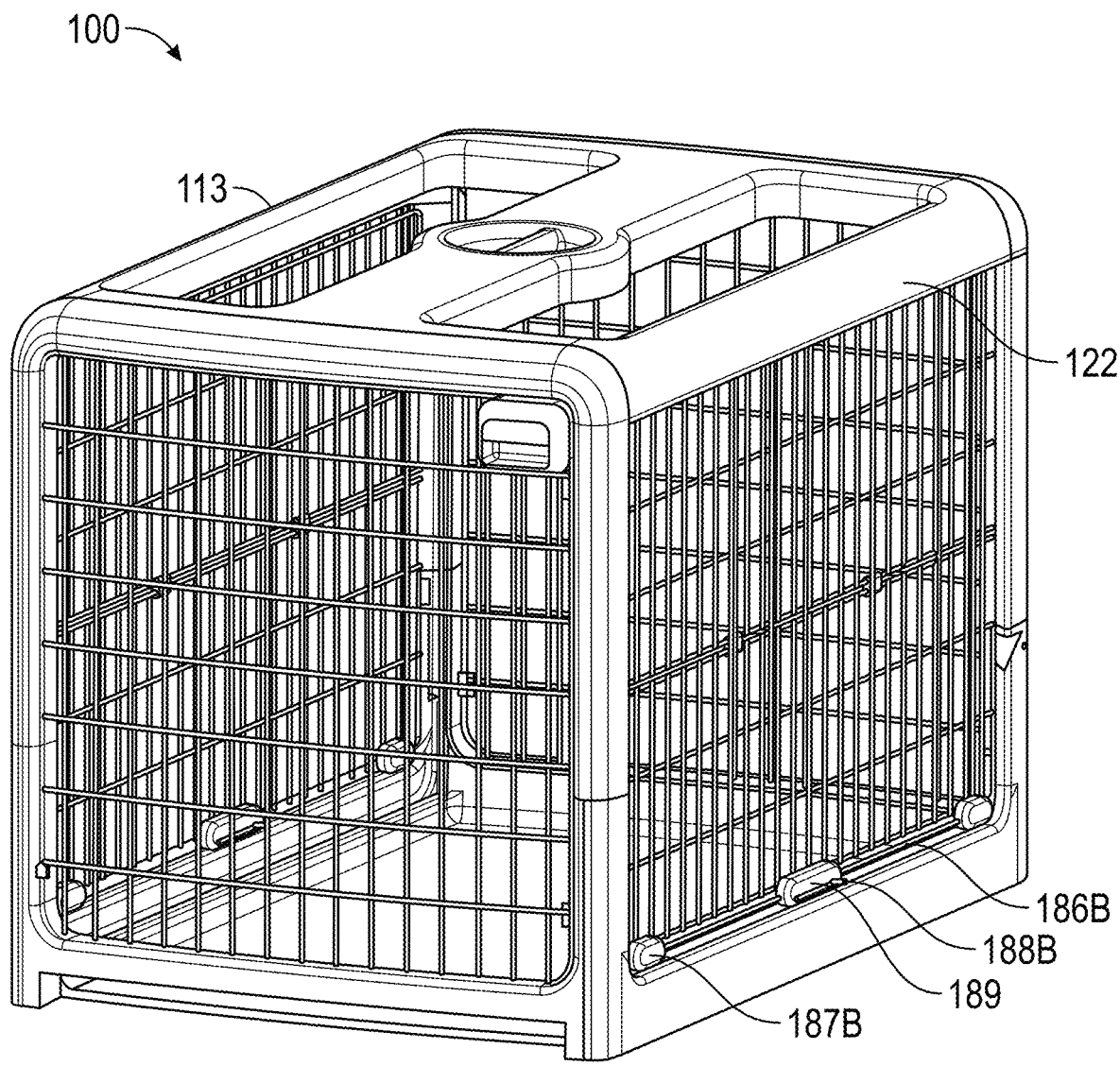
FIG. 1B is a front top perspective view of a collapsible crate assembly according to certain aspects of the present disclosure.
Figure 2:
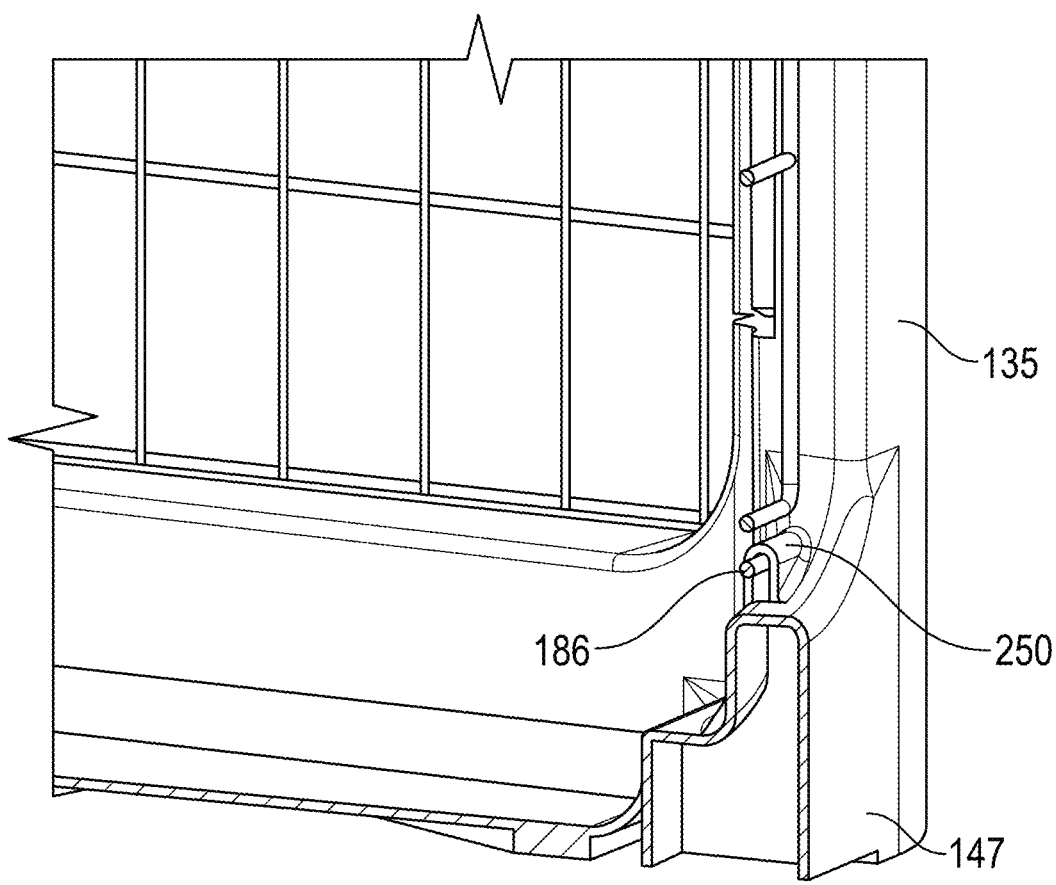
FIG. 2 is a cross-sectional view of a corner of the collapsible crate assembly according to an embodiment described herein.
Figure 3:
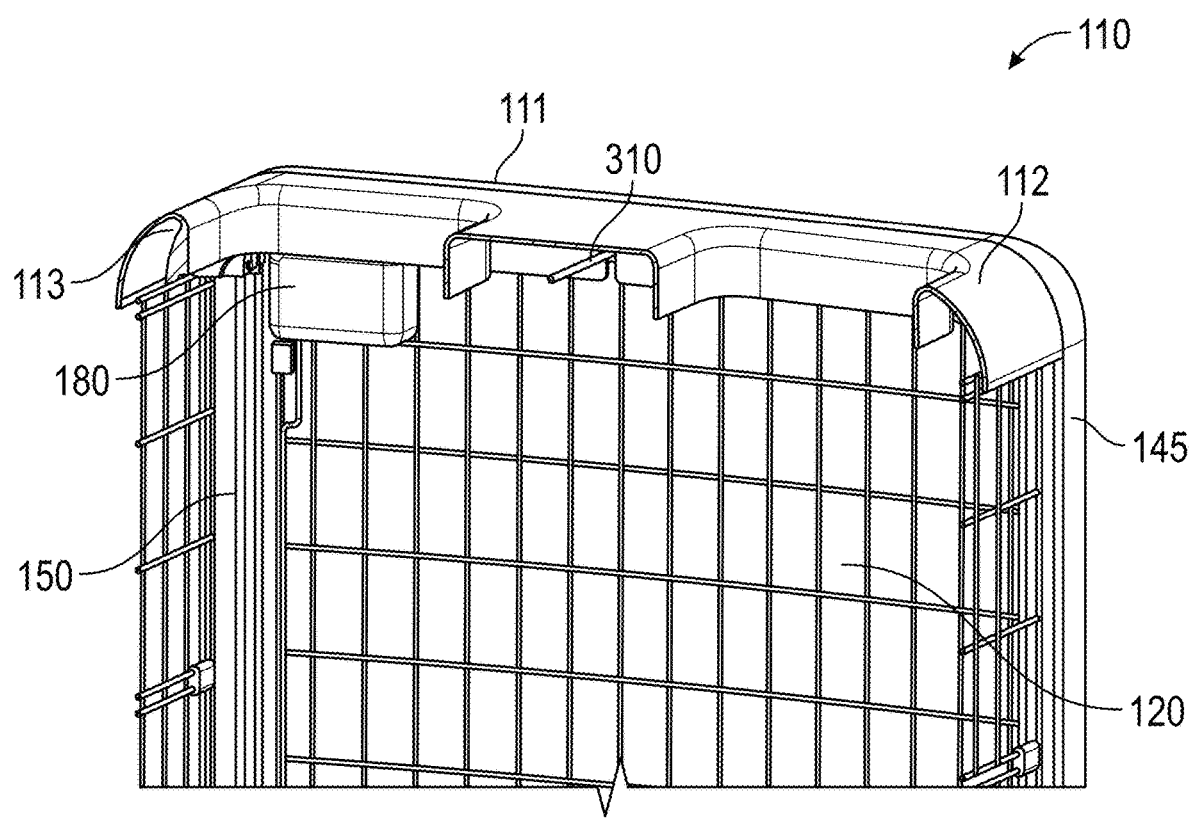
FIG. 3 is a cross-sectional view of a top of the collapsible crate assembly according to an embodiment described herein.

In the example of FIG. 1B, the latch pins 186B can be implemented such that engaging and disengaging the latch pins 186B into and out of the latch pin receivers 250 can be a single handed operation. For example, the latch pins 186B can be sufficiently long to extend from the latch pin receivers 250, through guide housings 187B disposed adjacent to the respective vertical member to a midpoint of the first side door and/or the second side door and held in place by a latch pin operation housing 189. Thus, the latch pins 186B can be of a shape such that an end terminating in the latch pin operation housing 189 can extend outward from the latch pin operation housing 189 providing operation handles 188B. The operation handles can be simultaneously depressed with one hand, disengaging the latch pins 186B from the latch pin receivers 250, thus allowing opening of the first side door and/or the second side door.

In some embodiments, slide tracks can be disposed within the first collapsible vertical member 135, the second collapsible vertical member 140, the third collapsible vertical member 145 and the fourth collapsible vertical member 150 such that the latch pins 186 may be guided along the respective vertical member during opening of the first side door and/or the second side door. The slide tracks can prevent the first side door and/or the second side door from swinging freely during opening and/or closing, providing a safe openable and closeable door for the animal contained within the collapsible crate assembly 100. Additionally, latch pin receivers similar to those described above can be disposed proximal to a top of the vertical members, such that the first side door and/or the second side door can be maintained in an open position by allowing the latch pins 186 to engage the latch pin receivers disposed at the top of the respective vertical member. In lieu of or in addition to latch pin receivers at the top of the vertical members, as described above, the first side door and/or the second side door may include a magnet for holding the door in the open position (i.e., folded or bifolded position as shown in FIG. 11D).

In a further embodiment, a locking mechanism can be disposed within the top 110 such that when the first side door and the second side door are moved into the open position, the hinge(s) 185 and/or a folded portion of the first side door and/or the second side door can be secured to the top 110 preventing the first side door and the second side door from swinging freely while in the open position (e.g., the first side door and the second side door are maintained substantially horizontal while in the open position).

Optionally, the mesh network 155 can be a collapsible mesh comprising a metal mesh, a steel cable mesh, a polymer mesh, or any suitable animal containment mesh, such that a door comprising a collapsible mesh can collapse vertically as the top 110 is lowered effectively compressing the first side 125 and the second side 130 vertically.

Figure 7A:
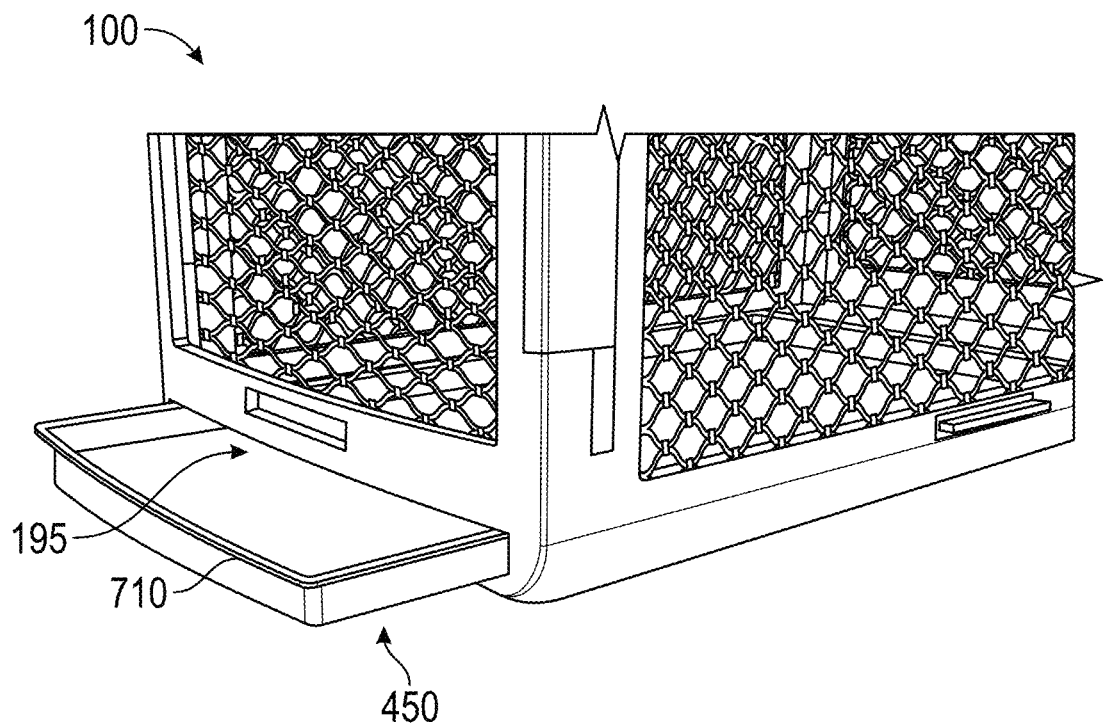
FIG. 7A is a front perspective view of the collapsible crate assembly according to an embodiment described herein.
Figure 7B:
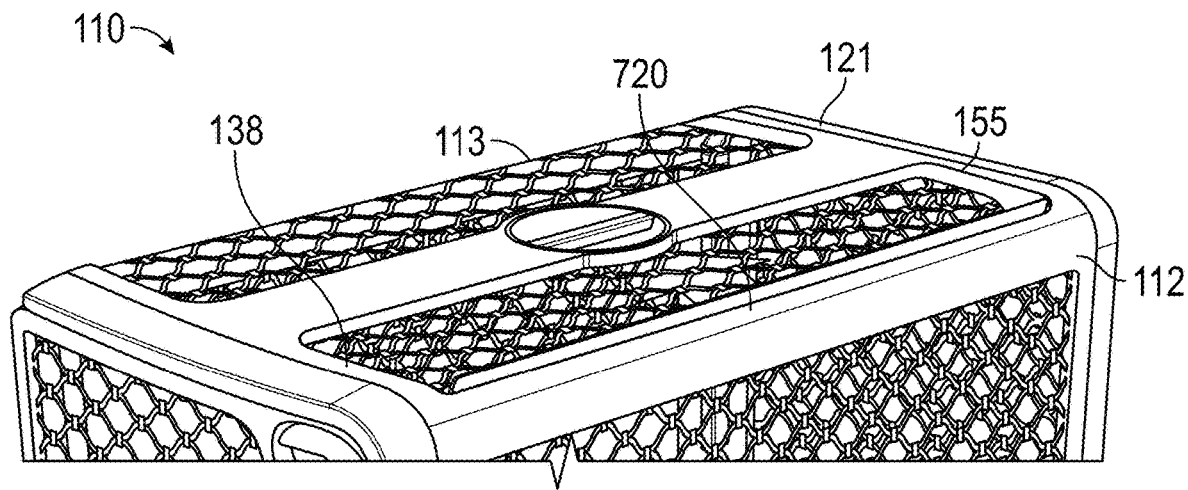
FIG. 7B is a perspective view of a top part of the collapsible crate assembly according to an embodiment described herein.
Figure 7C:
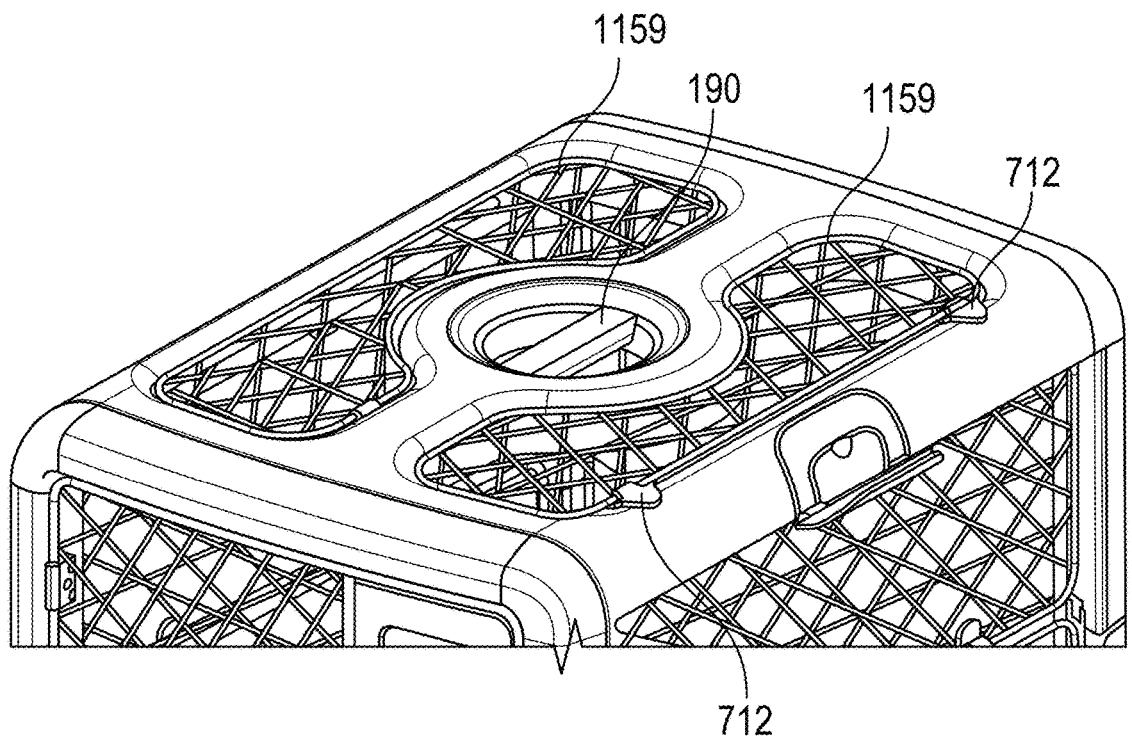
FIG. 7C is a perspective view of a top part of the collapsible crate assembly of FIG. 1A according to an embodiment described herein.
Figure 8A:
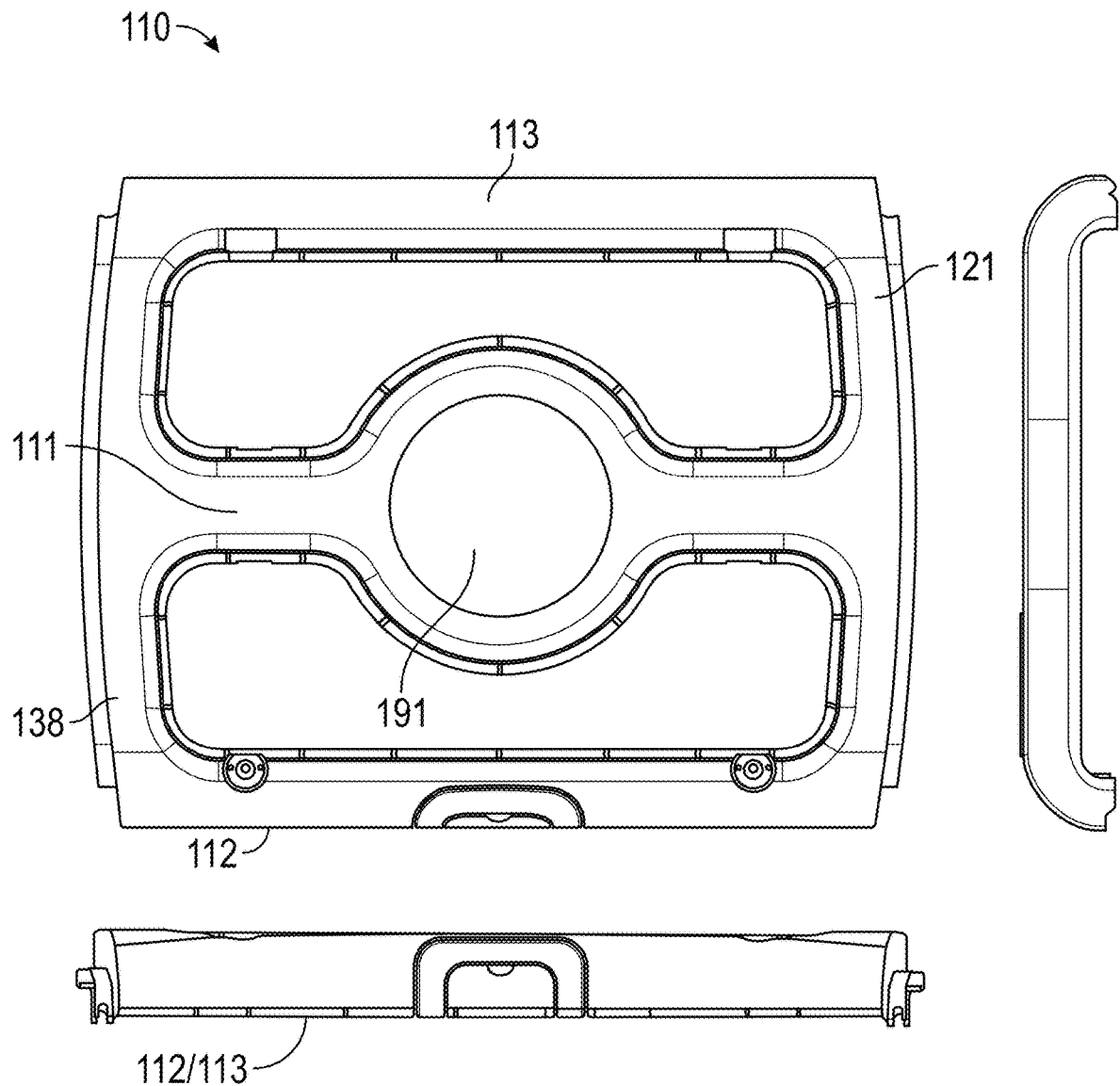
FIG. 8A is a schematic of a top part of the collapsible crate assembly of FIG. 1A according to an embodiment described herein.
Figure 8B:
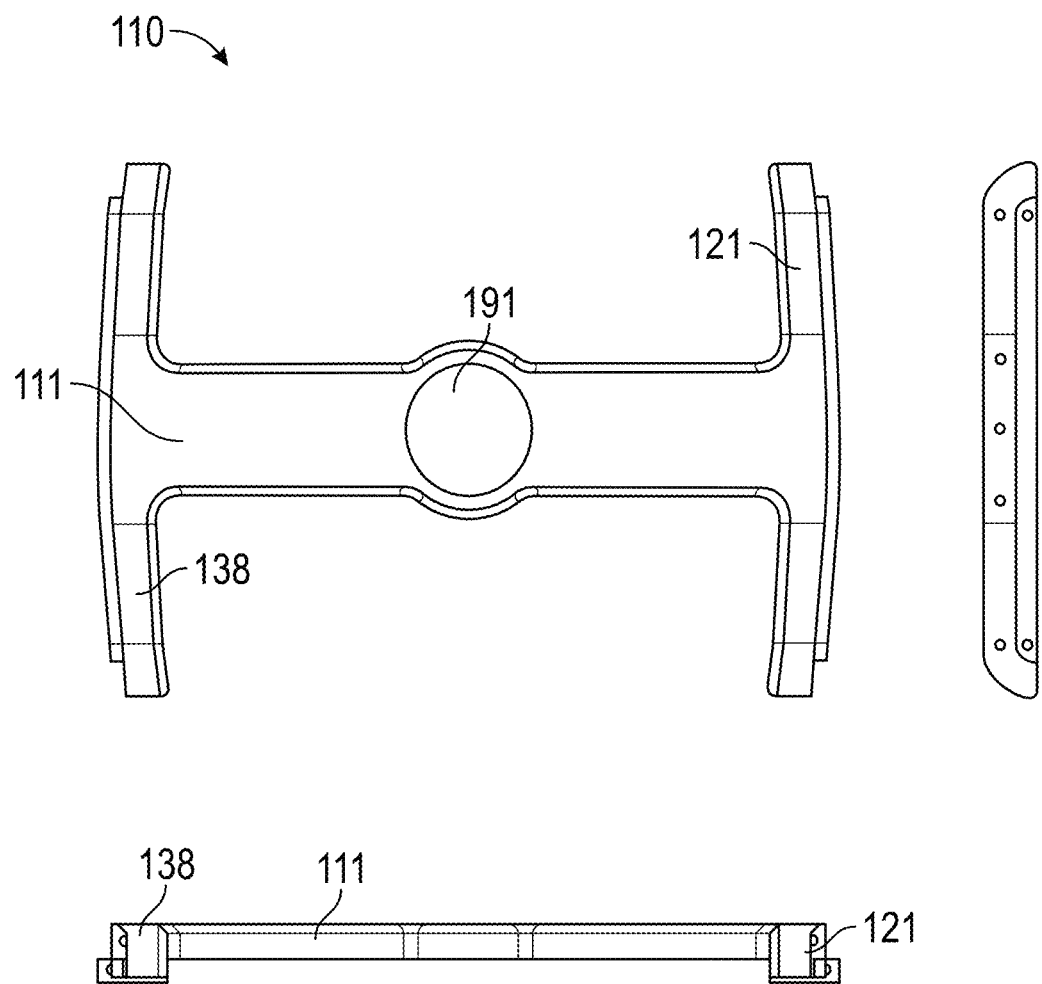
FIG. 8B is a schematic of a top part of the collapsible crate assembly according to an embodiment described herein.

The top 110 (see FIGS. 1A, 7B, 7C, and 8) can include a first horizontal member 111 disposed between the first side 125 and the second side 130 (in some embodiments, approximately halfway between first side 125 and second side 130) and extending longitudinally between the front 115 and the rear 120. The top can optionally include a first side horizontal member 112 that can be disposed above the first side 125 and a second side horizontal member 113 that can be disposed above the second side 130. A mesh network 155 may be disposed between the first horizontal member 111 and the first side horizontal member 112 and a mesh network 155 disposed between the first horizontal member 111 and the second side horizontal member 113 (see FIG. 7B). The mesh networks 155 may include one or more attachments points within the first horizontal member 111 (not visible), the first side horizontal member 112, the second side horizontal member 113, a front top horizontal member 138, and/or a rear top horizontal member 121 (see FIG. 7B). In some embodiments, the panel formed from the one or more of the mesh networks 155 may be disposed within the top 110 via hinges (not shown) attached to one or more of the first horizontal member 111, the first side horizontal member 112, the second side horizontal member 113, a front top horizontal member 138, and/or a rear top horizontal member 121. Optionally, the mesh network 155 can be opened by pulling upward on a handle disposed opposite the hinges (not shown) creating an opening (similar to the arrangement shown in FIGS. 11B and 11C). In some embodiments, the mesh network 155 can be suspended by tracks located within one or more of the first horizontal member 111, the first side horizontal member 112, the second side horizontal member 113, the front top horizontal member 138, and/or the rear top horizontal member 121. As shown in FIG. 7B, the mesh network 155 can be opened by applying force to a handle 720 to move/slide the mesh network 155 (see also: FIG. 11A). The mesh network 155 may be at least partially rigid or, in some embodiments, may a flexible component that compresses as the mesh network 155 moves to form an opening.

A multifunctional handle 190 may be disposed within the first horizontal member 111 in an opening 191 (see FIG. 1A) between the front 115 and the rear 120. The multifunctional handle 190 enables a user to carry the collapsible crate assembly 100 when in the deployed position and to collapse the collapsible crate assembly 100 when in the deployed position by moving and/or rotating the multifunctional handle 190. In some examples, the multifunctional handle 190 can rotate in either direction (clockwise or counter-clockwise) to allow the collapsible crate assembly 100 to move to the collapsed position. In other examples, the multifunctional handle 190 can only rotate in one direction (clockwise or counter-clockwise) to allow the collapsible crate assembly 100 to move to the collapsed position. The multifunctional handle 190 may include one or more springs and/or detents to bias the handle toward one or more positions. In some examples, the multifunctional handle 190 includes a locking feature to secure the multifunctional handle 190 in the deployed position (see FIG. 1A) to prevent unintended or inadvertent collapsing of the collapsible crate assembly 100. In some examples, multifunctional handle 190 is completely enclosed within the first horizontal member 111 to prevent foreign objects from interfering with or damaging the mechanism.

In some embodiments, top latch pins 310 (see FIG. 3) disposed within the first horizontal member 111 connect to the multifunctional handle 190 and are disposed longitudinally within the first horizontal member 111 and can insert into latch pin receivers (not visible) disposed within the front top horizontal member 138 or the rear top horizontal member 121. Rotating the multifunctional handle 190 can disengage the top latch pins 310 from the latch pin receivers disposed within the front top horizontal member 138 or the rear top horizontal member 121 enabling the collapsible crate assembly 100 to be collapsed.

Figure 4A:
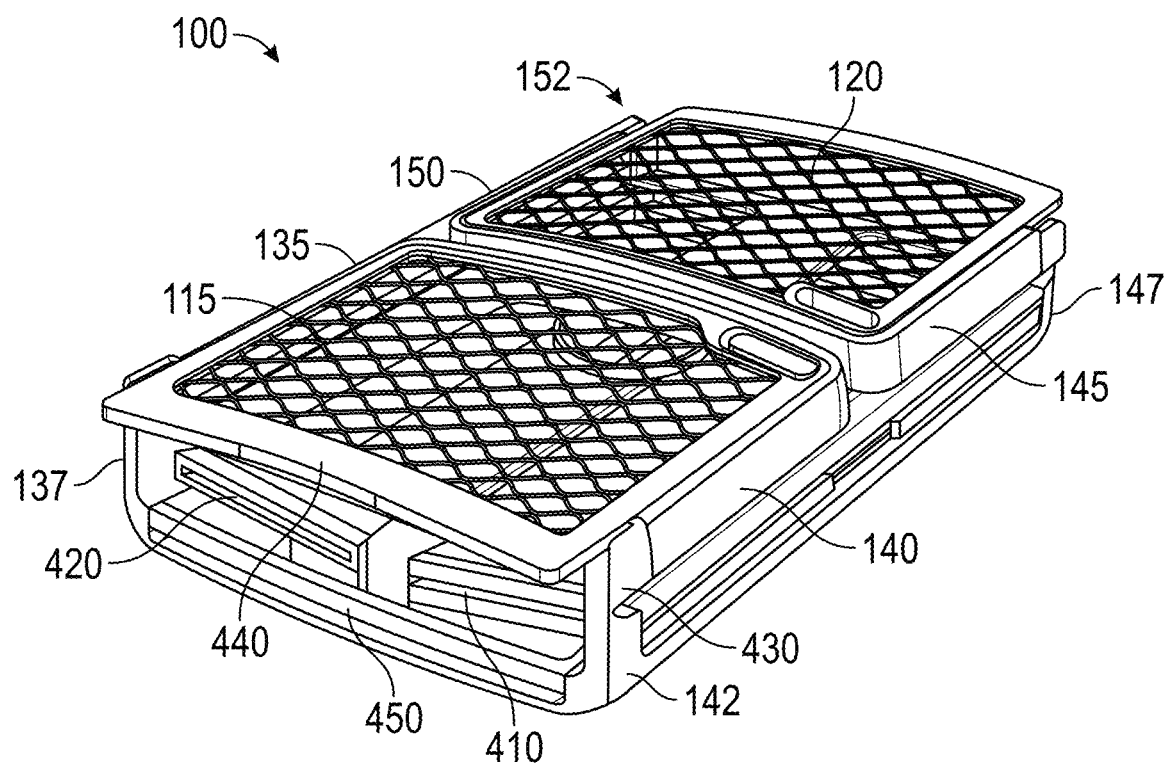
FIG. 4A is a front top perspective view of a collapsible crate assembly in a collapsed position according to certain aspects of the present disclosure.
Figure 4B:
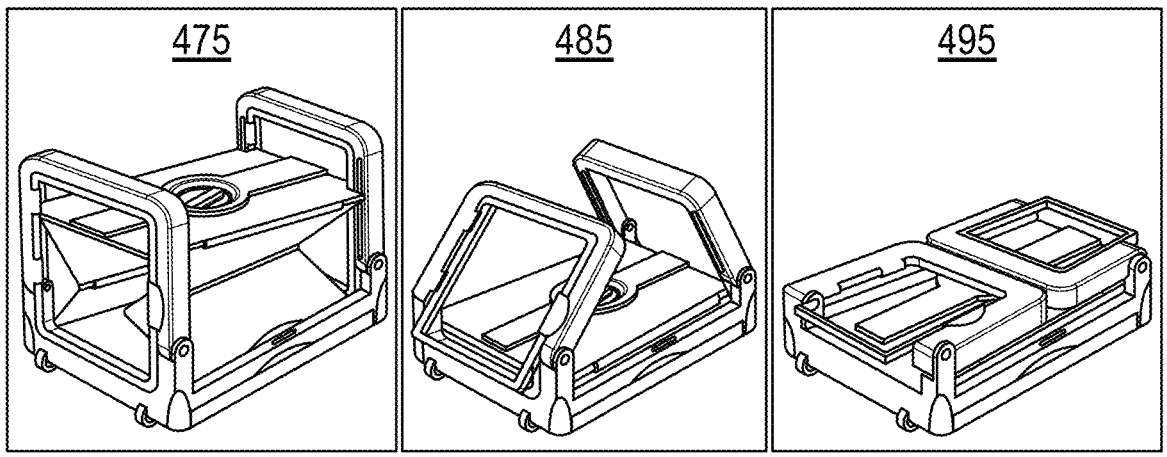
FIG. 4B is a process flow schematic for collapsing a collapsible crate assembly.

A representative embodiment is presented in FIG. 4A. In some examples, the collapsible crate assembly 100 can be collapsed from the deployed position to a collapsed position as illustrated in FIG. 4B. The multifunctional handle 190 can be rotated disengaging the top latch pins 310 disposed within the first horizontal member 111 from latch pin receivers disposed within the top of the front 115 and the top of the rear 120. The hinges 185 of the first side door 410 and the second side door 420 can allow the first side door 410 and the second side door 420 to fold inward (i.e., in a direction such that when folded the first side door is disposed horizontally above at least part of the bottom 105 and the second side door 420 is disposed horizontally above at least part of the bottom 105, see FIG. 4B). The first side door 410 and the second side door 420 fold inward simultaneously with the top 110 collapsing downward (block 475). In some embodiments, the multifunctional handle 190 also controls spring loaded pins that extend from the vertical members (135, 140, 145, 150) at approximately halfway between the bottom 105 and the top 110 to engage the first side door 410 and the second side door 420. After the first side door 410 and the second side door 420 and the top 110 are collapsed, the front 115 and the rear 120 can be folded inward (see FIG. 4B, block 485). Collapsing the front 115 and rear 120 is achieved by pivot points 430 disposed within the first collapsible vertical member 135, the second collapsible vertical member 140, the third collapsible vertical member 145 and the fourth collapsible vertical member 150. The collapsible crate assembly 100 is fully collapsed (block 495) when the front 115 and rear 120 are disposed directly above the collapsed first side door 410, second side door 420, and top 110.

In some embodiments, the collapsed crate assembly 100 can be maintained in the collapsed position by a locking mechanism (not shown) disposed within one or more of the first collapsible vertical member 135, the second collapsible vertical member 140, the third collapsible vertical member 145, and/or the fourth collapsible vertical member 150. The locking mechanism may be a spring pin (not shown) disposed within or adjacent to the pivot point 430. When the front 115 and/or rear 120 are collapsed, the spring pins engage spring pin receivers disposed at an exterior of the pivot points 430 such that when the front 115 and rear 120 are fully collapsed, a portion of the spring pin is protruding through the spring pin receiver and accessible by a user. Protrusion of the spring pin through the spring pin receiver locks the front 115 and/or rear 120 in the collapsed position. Applying a force in the axial direction of the spring pin (not shown) to drive the spring pin into the pivot point can disengage the spring pin from the spring pin receiver, thus unlocking the front 115 and/or rear 120 enabling deployment. In some embodiments, the locking mechanism can be an indentation or notch (not shown) disposed within a static portion of the pivot point 430 and a corresponding protrusion (not shown) disposed in a movable portion of the pivot point 430 such that when the front 115 and rear 120 are fully collapsed, the protrusion can engage the indentation thus locking the crate assembly 100 in the collapsed position. The protrusion may be a static component, a ball spring, a spring pin, a barb, or any other appropriate structure. Applying a force to the front 115 and/or the rear 120 can disengage the protrusion from the indentation enabling deployment.

Figure 5:
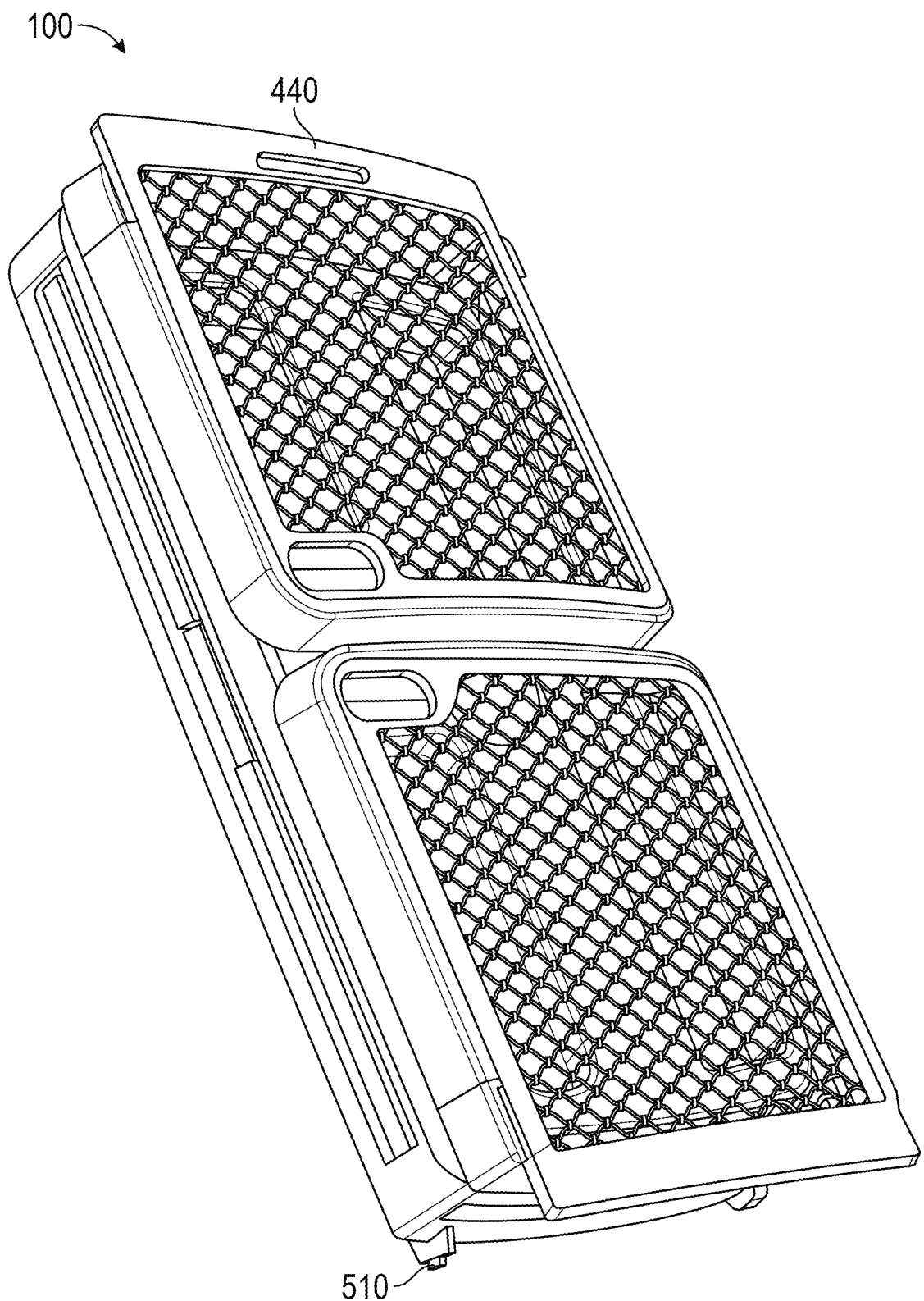
FIG. 5 is a front top perspective view of a collapsible crate assembly of FIG. 4.
Figure 6:
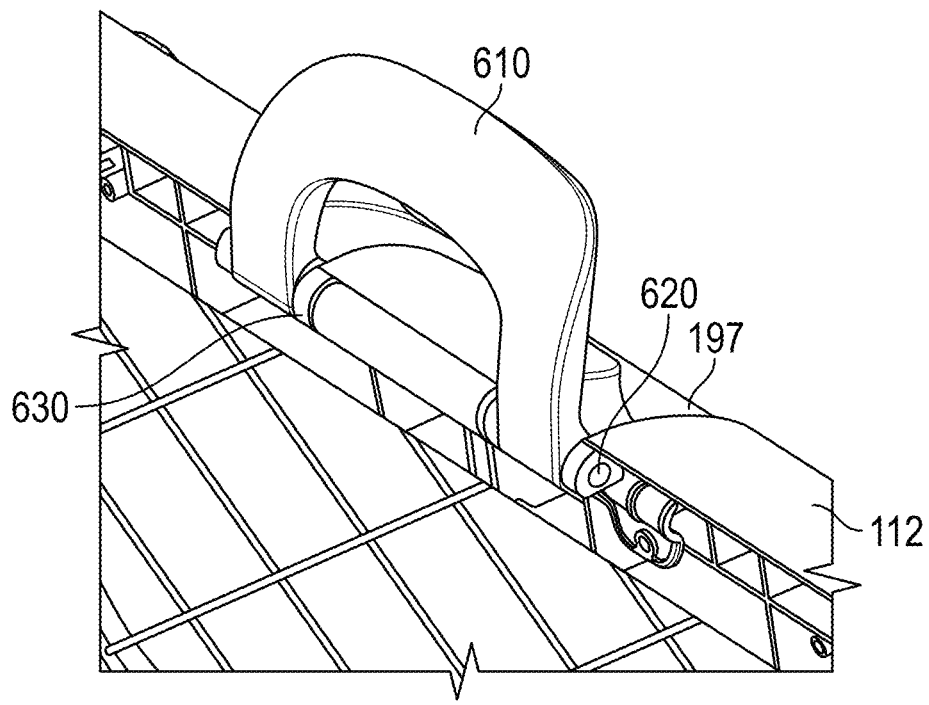
FIG. 6 is a front perspective view of a handle of the collapsible crate assembly of FIG. 1A according to an embodiment described herein.

After collapsing the crate assembly 100, as shown in FIGS. 4A and 5, the front 115 may include a grip handle 440 at a bottom portion thereof. In some embodiments, the bottom 105 may include a grip handle 442 located adjacent to the tray slot 195 (see FIG. 1A). In some examples, wheels 510 (see FIG. 5) can be disposed on a bottom portion of the rear 120 of the crate assembly 100. In some aspects, the wheels 510 are disposed on a side opposite the grip handle 440 (and/or grip handle 442 (see FIG. 1A)). The crate assembly 100 can be transported using the wheels in either the collapsed or in the deployed position. In some embodiments, an additional handle (not shown) may be attached to horizontal front member 138 to pull the crate assembly 100 via the wheels in the deployed position.

In some further embodiments, the first horizontal side member 112 and/or the second horizontal side member 113 can include a carry handle 195 (see FIG. 1A). In some cases, the carry handle 195 can be a hinged molded handle 610 disposed within the first horizontal side member 112 and/or the second horizontal side member 113. The hinged molded handle 610 can have a hinge pin 620 disposed within the hinged molded handle 610 creating a pivoting edge of the hinged molded handle 610 (see FIG. 6). The hinge pin 620 can extend through the hinged molded handle 610 and beyond a first side of the hinged molded handle 610 and beyond a second side of the hinged molded handle 610 such that the hinge pin 620 can be inserted into hinge pin receivers 630 disposed within the first horizontal side member 112 and/or the second horizontal side member 113. For example, the hinged molded handle 610 can further include a spring loaded mechanism that can maintain the hinged molded handle 610 in a position such that the hinged molded handle 610 rests within a recess 197 within the first horizontal side member 112 and/or the second horizontal side member 113. In some cases, the recess 197 can have a shape similar to the hinged molded handle 610 having a larger area such that the hinged molded handle 610 can rest flush with an exterior surface the first horizontal side member 112 and/or the second horizontal side member 113. In some aspects, the hinged molded handle 610 can be deployed into a position suitable for carrying the collapsed crate assembly 100 by applying sufficient force to overcome the spring loaded mechanism and extending the hinged molded handle 610 outward from the first horizontal side member 112 and/or the second horizontal side member 113 thereby pivoting about the hinge pin 620 disposed within the hinged molded handle 610.

In some further embodiments, the carry handle 195 can be a strap attached to the first horizontal side member 112 and/or the second horizontal side member 113. In some cases, the strap can be attached via at least a mechanism that allows the strap to move from a first position wherein the strap is maintained adjacent to the first horizontal side member 112 and/or the second horizontal side member 113 and a second position wherein the strap is extended away from the first horizontal side member 112 and/or the second horizontal side member 113 such that a user can grasp the strap. Optionally, a second mechanism that allows the strap to move from a first position wherein the strap is maintained adjacent to the first horizontal side member 112 and/or the second horizontal side member 113 and a second position wherein the strap is extended away from the first horizontal side member 112 and/or the second horizontal side member 113 such that a user can grasp the strap can be employed, further facilitating motion of the strap from the first position to the second position.

In some further embodiments, the carry handle 195 can be a handle molded into the first horizontal side member 112 and/or the second horizontal side member 113 during production of the first horizontal side member 112 and/or the second horizontal side member 113. In a still further embodiment, the carry handle 195 can be an elliptical hole disposed within the first horizontal side member 112 and/or the second horizontal side member 113 such that a user can insert at least a portion of the user's hand into the elliptical hole to lift and/or carry the collapsible crate assembly 100.

In some further embodiments, the first horizontal side member 112 and/or the second horizontal side member 113 of the collapsible crate assembly 100 can have no handles, as in the example of FIG. 1B.

The collapsible crate assembly 100 can be restored to the deployed position. The front 115 and rear 120 can be raised from collapsed positions exposing the collapsed top 110. The deployed crate assembly 100 can be maintained in the deployed position by a locking mechanism (not shown) disposed within one or more of the first collapsible vertical member 135, the second collapsible vertical member 140, the third collapsible vertical member 145, and/or the fourth collapsible vertical member 150. The locking mechanism may be a spring pin (not shown) disposed within or adjacent to the pivot point 430. When the front 115 and/or rear 120 are deployed, the spring pins engage spring pin receivers disposed at an exterior of the pivot points 430 such that when the front 115 and rear 120 are fully deployed, a portion of the spring pin is protruding through the spring pin receiver and accessible by a user. Protrusion of the spring pin through the spring pin receiver locks the front 115 and/or rear 120 in the deployed position. Applying a force in the axial direction of the spring pin (not shown) to drive the spring pin into the pivot point can disengage the spring pin from the spring pin receiver, thus unlocking the front 115 and/or rear 120 enabling collapse. In some embodiments, the locking mechanism can be an indentation or notch (not shown) disposed within a static portion of the pivot point 430 with a corresponding protrusion (not shown) disposed in a movable portion of the pivot point 430 such that when the front 115 and rear 120 are fully deployed, the protrusion can engage the indentation thus locking the crate assembly 100 in the deployed position. The protrusion may be a static component, a ball spring, a spring pin, a barb, or any other appropriate structure. Applying a force to the front 115 and/or the rear 120 can disengage the protrusion from the indentation enabling collapse.

The multifunctional handle 190 can be used to raise the top 110 and simultaneously unfold the first side 410 and the second side 420. When the top 110 is fully raised and the first side 410 and the second side 420 are fully extended, the multifunctional handle 190 can be rotated to engage the top latch pins 310 into latch pin receivers (not visible) disposed within the top horizontal front member 138 and disposed within the top horizontal rear member 121.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

In another embodiment, the top 1100 (see FIGS. 11A and 11B) may include a first horizontal member 1110 joining the first collapsible vertical member 1135 and the third collapsible vertical member 1145, and a second horizontal member 1115 joining the second collapsible vertical member 1140 and the fourth collapsible vertical member 1150 such that the first horizontal member and the second horizontal member form a cross pattern within the top 1100 of the crate assembly 100. The top 1100 can optionally include a first side horizontal member 1112 that can be disposed above the first side 1125 and a second side horizontal member 1113 that can be disposed above the second side 1130. The top 1100 can optionally include a mesh network 1155 disposed within areas defined by the first horizontal member and the second horizontal member and the first side horizontal member 1112 and the second side horizontal member 1113 and the top horizontal front member 1138 and the top horizontal rear member 1121. The mesh network disposed within the top 1110 may include one or more sections that are triangular, trapezoidal, and/or any other appropriate shape. The mesh network 1155 can be openable for top access to an interior of the crate assembly. The mesh network can attach to the first horizontal member or the second horizontal member or the first side horizontal member 1112 or the second side horizontal member 1113 or the top horizontal front member 1138 or the top horizontal rear member 1121 with hinges (see FIGS. 11B and 11C). The mesh network can be secured to the first horizontal member or the second horizontal member or the first side horizontal member 1112 or the second side horizontal member 1113 or the top horizontal front member 1138 or the top horizontal rear member 1121 with clips. The clips can be released from the first horizontal member or the second horizontal member or the first side horizontal member 1112 or the second side horizontal member 1113 or the top horizontal front member 1138 or the top horizontal rear member 1121 such that the mesh network 1155 can be opened upward.

Optionally, the mesh network 1155 can further be disposed within the top 1110 via attachment points within the first horizontal member 1110 (not visible), the second horizontal member 1115, the first side horizontal member 1112, the second side horizontal member 1113, a front top horizontal member 1138 or a rear top horizontal member 1121 (see FIG. 11B). the mesh network 1155 can be suspended by tracks located within the first horizontal member 1111, the second horizontal member 1115, the first side horizontal member 1112, the second side horizontal member 1113, the front top horizontal member 1138 or the rear top horizontal member 1121. As shown in FIG. 11A, the mesh network can be opened by applying force to a handle 1160 to slide the mesh network 1155 within the tracks located within the first horizontal member 1110, the second horizontal member 1115, the first side horizontal member 1112, the second side horizontal member 1113, the front top horizontal member 1138 or the rear top horizontal member 1121 thereby compressing the mesh network 1155 and forming an opening. Optionally, the mesh network 1155 can further be disposed within the top 1110 via hinges (not shown) attached to the first horizontal member 1111, the second horizontal member 1115, the first side horizontal member 1112, the second side horizontal member 1113, a front top horizontal member 1138 or a rear top horizontal member 1121 as one or more top doors 1159. In some embodiments, as shown in FIGS. 11B and 11C, the top doors 1159 with the mesh network 1155 can be pivoted upward as a top door 1159 opening by pulling upward on a handle 1160 disposed opposite the hinges. The top door 1159 opening may include at least one latch 712 (see FIG. 7C), which can be disengaged to allow the top door 1159 to open. A multifunctional handle 1190 is disposed within an intersection of the first horizontal member 1110 and the second horizontal member 1115 at a central point midway between the front 1105 and the rear 1120 and midway between the first side 1125 and the second side 1130. The multifunctional handle 1190 enables a human user to carry the collapsible crate assembly 100 when in the deployed position and to collapse the collapsible crate assembly 100 when in the deployed position by rotating the multifunctional handle 1190. Top latch pins 310 (see FIG. 3) disposed within the first horizontal member and the second horizontal member connect to the multifunctional handle 1190 and are disposed longitudinally within the first horizontal member and the second horizontal member and can insert into latch pin receivers (not visible) disposed within the first collapsible vertical member 1135, the second collapsible vertical member 1140, the third collapsible vertical member 1145 and the fourth collapsible vertical member 1150. Rotating the multifunctional handle 1190 can disengage the top latch pins 310 from the latch pin receivers disposed within the front top horizontal member 1138 or the rear top horizontal member 1121 enabling the collapsible crate assembly to be collapsed.

Figure 12:
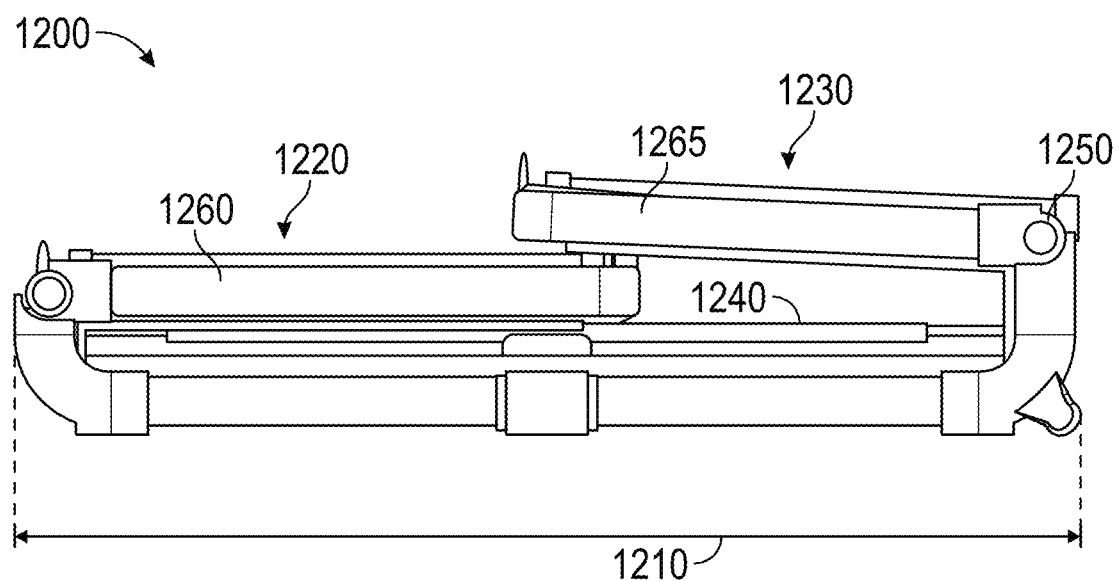
FIG. 12 is a side view of a collapsible crate assembly according to an embodiment described herein.

In a further embodiment, a collapsible crate assembly 1200 (see FIG. 12) can have dimensions such that a bottom long transverse dimension 1210 is less than a height of the crate assembly multiplied by two, such that when in the collapsed position, a front portion 1220 or a rear portion 1230 can be disposed directly above a collapsed top and sides 1240, and a portion of the rear portion 1230 or a portion of the front portion 1220 can partially rest on the front portion 1220 or the rear portion 1230 disposed directly above the collapsed top and sides 1240 (see FIG. 12), such that the front portion 1220 and the rear portion 1230 are collapsed asymmetrically. This asymmetric collapse is accomplished by pivot points 1250 being disposed at differing heights in a first collapsible vertical member 1260, a second collapsible vertical member (not visible), a third collapsible vertical member 1265 and a fourth collapsible vertical member (not visible), wherein the pivot points 1250 are disposed at equal heights in the first collapsible vertical member 1260, and the second collapsible vertical member (not visible); and wherein the pivot points 1250 are disposed at equal heights in the third collapsible vertical member 1265 and the fourth collapsible vertical member (not visible) (see FIG. 12).

In a still further embodiment, a collapsible crate assembly 1300 can have any suitable shape. Any suitable shape, as used herein, comprises any volumetric shape capable of containing an animal in the spirit of the present disclosure such that the collapsible crate assembly 1300 is easy to operate, aesthetically pleasing, quiet, light, durable, easy to clean, and safe and comfortable for the animal. It will be obvious to a person of skill in the art that differing designs will require differing functional mechanisms in order to achieve the desired characteristics listed above. In some non-limiting examples the shape can be an elliptic cylinder (see FIG. 13A). The elliptic cylinder crate 1300 comprises a collapsible door assembly 1310, collapsible vertical members 1350, an elliptical bottom assembly 1360, and an elliptical top assembly 1370.

Figure 13B:
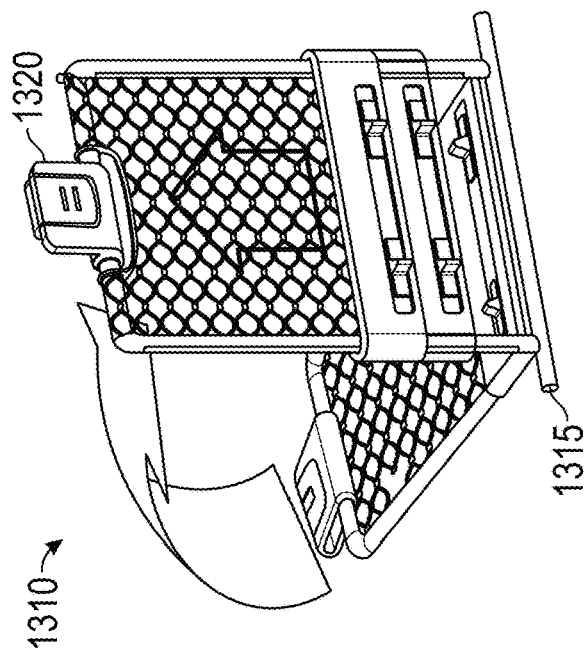
FIG. 13B is a schematic of a door assembly according to an embodiment described herein.
Figure 13C:
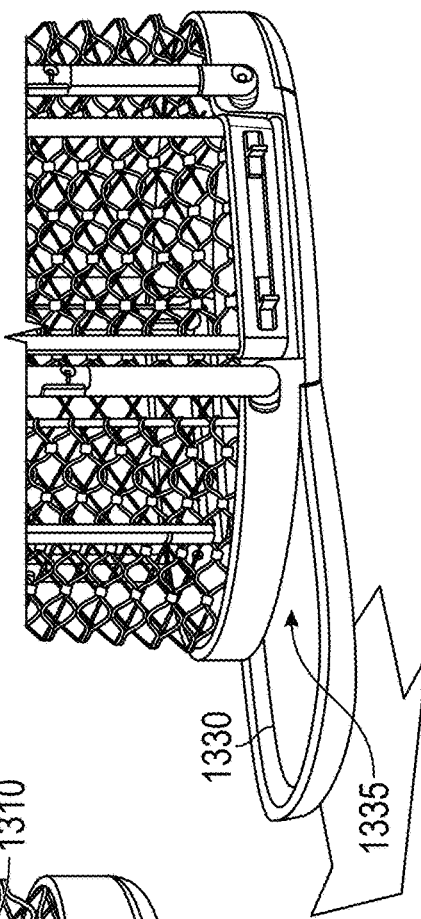
FIG. 13C is a perspective view of a bottom of a collapsible crate assembly according to an embodiment described herein.
Figure 13A:
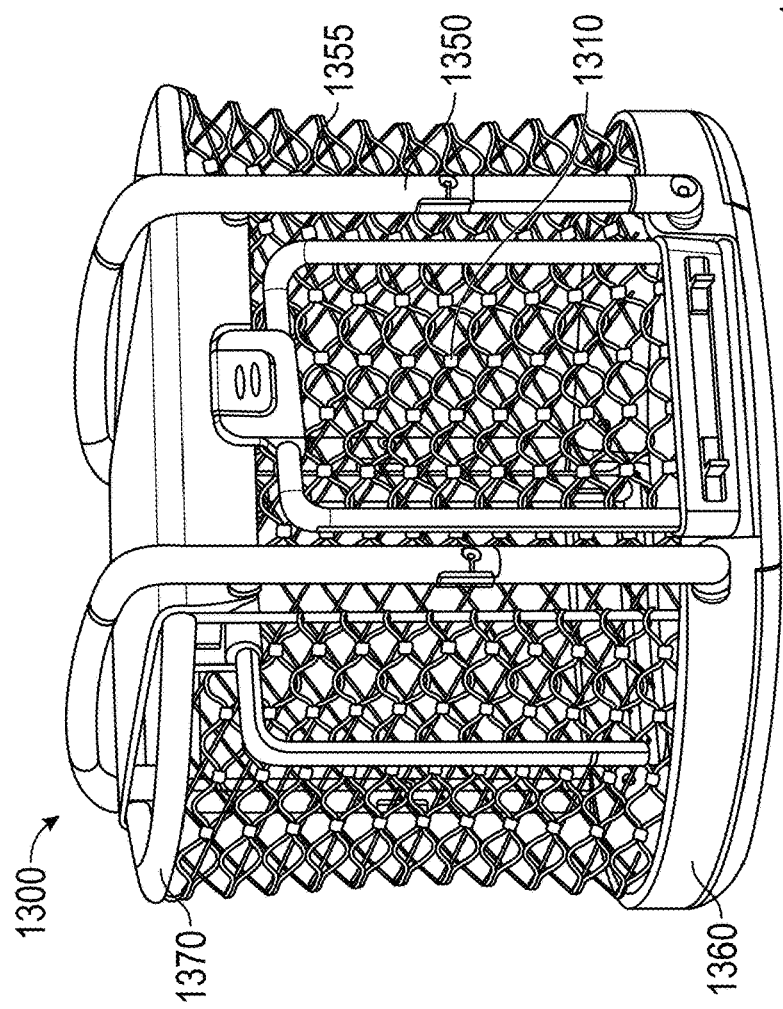
FIG. 13A is a top perspective view of a collapsible crate assembly according to an embodiment described herein.
Figure 13D:
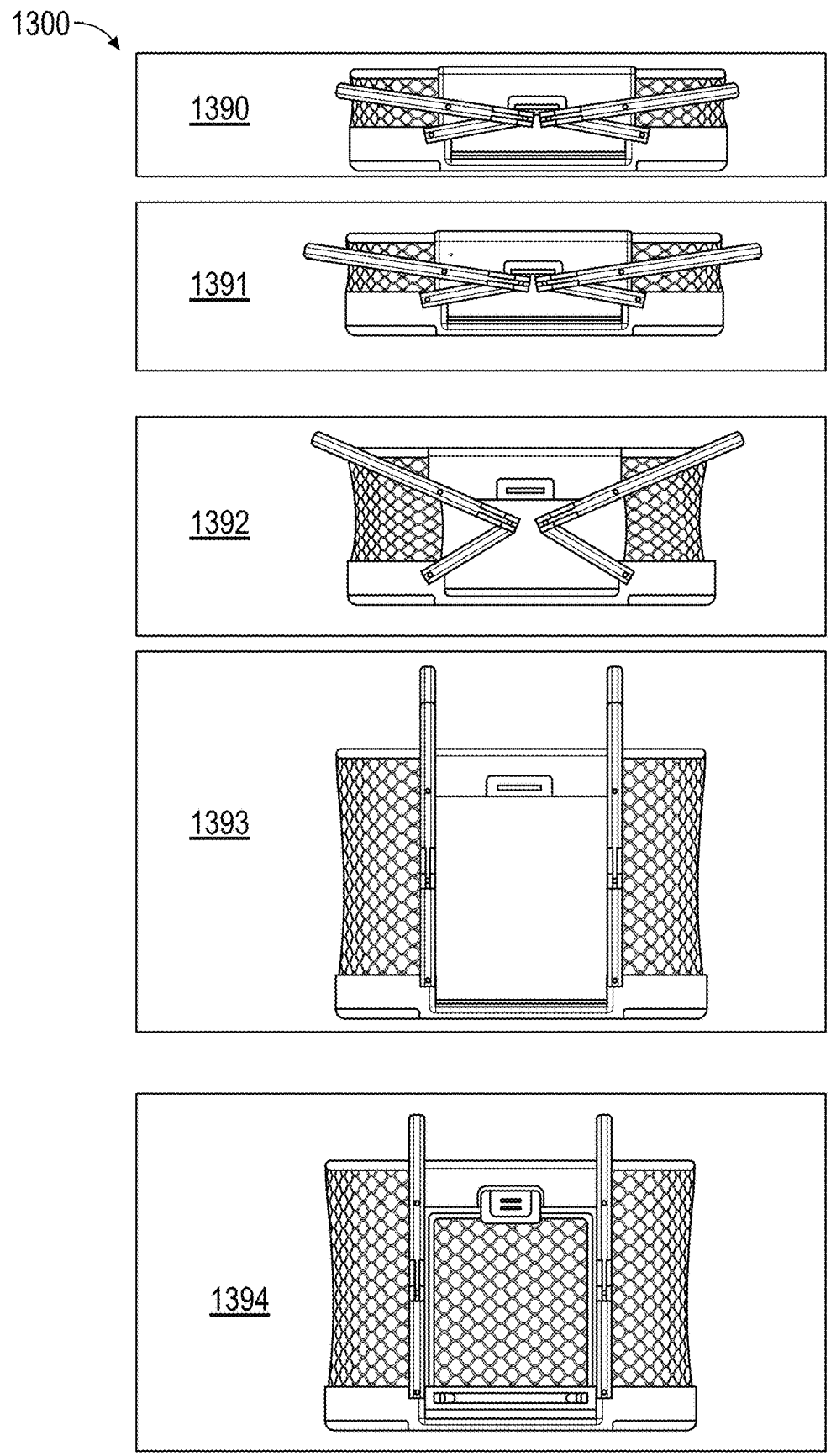
FIG. 13D is a process flow schematic for collapsing a collapsible crate assembly according to an embodiment described herein.

FIG. 13B illustrates a collapsible door assembly 1310 suitable for use in the elliptic cylinder crate design 1300. The collapsible door assembly 1310 can pivot about pivot points 1315 allowing the collapsible door assembly 1310 to collapse into the elliptic cylinder crate 1300. To deploy the elliptic cylinder crate 1300, when the collapsible door assembly 1310 is in a vertical position the collapsible door assembly 1310 can engage the elliptical top assembly 1370 via a locking handle and clip assembly 1320. A removable tray 1330 (see FIG. 13C) can be extracted from a tray slot 1335 for cleaning and removal of any animal byproducts. An exemplary method for deploying and collapsing the elliptic cylinder crate 1300 is illustrated in FIG. 13D. A collapsed elliptic cylinder crate 1300 (block 1390) can be placed on any suitable surface (e.g., a floor or a ground). The collapsible vertical members 1350 can be extended to release a locking mechanism (not shown) (block 1391). Once extended and unlocked, the collapsible vertical members 1350 can be raised upward deploying the elliptical top assembly 1370 and mesh network 1355 (block 1392). When the collapsible vertical members 1350 are fully deployed the collapsible vertical members 1350 can be compressed to lock the elliptic cylinder crate 1300 in a deployed position (block 1393). The collapsible door assembly(-ies) 1310 can be raised, extended and locked into a deployed position via the locking handle and clip assembly(-ies) 1320 (block 1394).

In some embodiments, the collapsible crate assembly 100 can be produced using any suitable material. In some embodiments, the collapsible crate assembly includes cast aluminum alloys, extruded aluminum alloys, rolled aluminum alloys, cast steel alloys, rolled steel alloys, extruded steel alloys, stainless steel, blow molded plastics, injection molded plastics, rotational molded plastics, extruded plastics, or any combination thereof. For example, the bottom 105 can be an injection molded plastic, the front 115 and rear 120 can be an aluminum alloy and the top 110 can be an extruded plastic. Moreover, the components of the collapsible crate assembly 100 may be constructed and/or attached to one another via suitable fasteners, which include, but are not limited to, screws, bolts, rivets, welding, spot welding, adhesive, or other mechanical or chemical fasteners.

In some further embodiments, the collapsible crate assembly 100 can include an accessory port or receiver 161 disposed within the collapsible crate assembly 100. The accessory port or receiver 161 can be used to mount a Wi-Fi camera, an automatic feeder, an automatic waterer, a speaker, a mobile cellular device, any combination thereof, or any suitable device a pet owner may want to mount within a pet crate.

In some further embodiments, the collapsible crate assembly 100 can include a divider system (e.g., to sequester a plurality of young animals or to provide a smaller environment for at least a young animal). In some cases, the divider system can include a partition. Additionally, the divider system can include grooves disposed within the bottom 105, and corresponding grooves disposed within the top 110, the first horizontal side member 112, the second horizontal side member 113, the front top horizontal member 138, the rear top horizontal member 121, or any suitable portion of the support structure, such that the corresponding grooves disposed within the top 110, the first horizontal side member 112, the second horizontal side member 113, the front top horizontal member 138, the rear top horizontal member 121, or any suitable portion of the support structure are positioned substantially vertically above the grooves disposed within the bottom 105. In some embodiments, the partition can be inserted into the grooves to create at least a reduced area animal containment area. The partition can be any suitable material such that an animal can be contained by the partition, including, for example, metals, alloys, polymers, fabrics, glasses, wood, or ceramics.

In some embodiments, the collapsible crate assembly 100 can include a mat disposed within the tray 450. The mat can be a polymer mat (e.g., a natural rubber mat, a polystyrene mat, a synthetic rubber mat, any suitable polymer material, or any combination thereof), a silicon-based mat (e.g., silicone, polysilicon, or any suitable silicon-based material), or any suitable material mat. In some embodiments, the collapsible crate assembly 100 can include a mattress disposed within the tray 450. The mattress can be a polymer mattress (e.g., a natural rubber mattress, a latex mattress, a synthetic rubber mattress, a memory foam mattress, any suitable polymer material, or any combination thereof), a silicon-based mattress (e.g., silicone, polysilicon, or any suitable silicon-based material), or any suitable material mattress. In some cases, the mattress can further include a mattress cover. The mattress cover can be water-proof, rip-proof, removable from the mattress, and washable.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A collapsible crate assembly, comprising:
a front side comprising a first vertical member, a second vertical member, a front top member, and a first portion of a mesh network, wherein the front side comprises a front side length;
a rear side opposite the front side, the rear side comprising a third vertical member, a fourth vertical member, a rear top member, and a second portion of the mesh network;
a first side between the front side and the rear side, the first side comprising a third portion of the mesh network that is movable relative to the front side and the rear side and between the front side and the rear side, the first side comprising a first side length that is greater than the front side length;
a second side opposite the first side and between the front side and the rear side, the second side comprising a fourth portion of the mesh network;
a bottom comprising a base panel, wherein the first vertical member, the second vertical member, the third vertical member, and the fourth vertical member each extend from the bottom; and
a top comprising:
a first top member extending from the front side to the rear side;
a second top member extending from the front side to the rear side opposite from the first top member;
an intermediate top member extending from the front side to the rear side between the first top member and the second top member;
a first top portion of the mesh network extending between the intermediate top member and the first top member; and
a second top portion of the mesh network extending between the intermediate top member and the second top member,
wherein the collapsible crate assembly is configurable between a collapsed configuration and a deployed configuration,
wherein, in the deployed configuration, the top is a first distance from the base panel,
wherein, in the collapsed configuration, the top is a second distance from the base panel that is less than the first distance,
wherein the collapsible crate assembly further comprises a multifunctional handle disposed in the intermediate top member, wherein the multifunctional handle comprises a mechanism configured to lock the collapsible crate assembly in the deployed configuration, and
wherein the mechanism comprises at least one latch pin disposed within the intermediate top member; wherein, in the deployed configuration, the at least one latch pin engages with at least one of the front side or the rear side; and wherein, in the collapsed configuration, the at least one latch pin disengages from the at least one of the front side or the rear side.

2. The collapsible crate assembly of claim 1, wherein the front side and the rear side are substantially parallel to each other in the deployed configuration, the first side and the second side are substantially parallel to each other in the deployed configuration, and the top and the bottom are substantially parallel to each other in both the deployed configuration and in the collapsed configuration.

3. The collapsible crate assembly of claim 1, wherein a movement of the multifunctional handle moves the mechanism and enables movement of the collapsible crate assembly between the deployed configuration and the collapsed configuration.

4. The collapsible crate assembly of claim 1, wherein the front side further comprises a front door attached to the first vertical member or the second vertical member and movable relative to the first vertical member and the second vertical member, wherein the front door comprises:
the first portion of the mesh network;
a hinge attached to the first vertical member;
a latch pin disposed on a side of the front door opposite the hinge, wherein the latch pin is configured to engage a latch pin receiver disposed on the second vertical member; and
a latch pin release mechanism disposed within a housing, wherein the latch pin release mechanism is accessible from a single direction relative to the collapsible crate assembly when the collapsible crate assembly is in the deployed configuration, wherein the latch pin release mechanism biases the latch pin into engagement with the latch pin receiver.

5. The collapsible crate assembly of claim 1, wherein the mesh network comprises one or more metals, polymers, alloys, copolymers, carbon fiber, wood, bamboo, rope, glass, nonwoven fabrics, woven fabrics, or knit fabrics.

6. The collapsible crate assembly of claim 1, wherein the top further comprises a first top door between the first top member and the intermediate top member and a second top door between the intermediate top member and the second top member, wherein the first top door comprises the first top portion of the mesh network and the second top door comprises the second top portion of the mesh network.

7. The collapsible crate assembly of claim 6, wherein the first top door further comprises:
a hinge on the first top member such that the first top door is pivotably attached to the first top member and movable between a closed position and an open position, wherein, in the open position, the first top door enables access to an upward opening between the intermediate top member and the first top member.

8. The collapsible crate assembly of claim 1, wherein:
the top further comprises a side handle disposed within one of the first top member or the second top member.

9. The collapsible crate assembly of claim 1, wherein, in the collapsed configuration, the first side and the second side are each folded under the top, and the top is retained between the bottom and the front side and the rear side.

10. The collapsible crate assembly of claim 1, further comprising an accessory receiver, wherein the accessory receiver further comprises adapter hardware for mounting an accessory including a Wi-Fi camera, an automatic feeder, an automatic waterer, a speaker, a mobile cellular device, or any combination thereof.

11. A method of deploying a collapsible crate assembly of claim 1 from a collapsed position, the method comprising:
pivoting a front side upward away from a bottom of the collapsible crate assembly;

pivoting a rear side upward away from the bottom of the collapsible crate assembly and in an opposite direction of the front side;

raising a top away from the bottom while simultaneously unfolding a first side and a second side, wherein the first side and the second side each comprise hinges disposed horizontally; and rotating a multifunctional handle in the top, wherein rotating the multifunctional handle engages top latch pins disposed within an intermediate top member of the top that engage latch pin receivers disposed within a top portion of the front side and a top portion of the rear side.

12. A collapsible pet crate comprising:

a base;

a front side comprising a first vertical member, a second vertical member, and a front top member extending between a top of the first vertical member and a top of the second vertical member;

a rear side comprising a third vertical member, a fourth vertical member, and a rear top member extending between a top of the third vertical member and a top of the fourth vertical member;

a top side comprising a first side member, a second side member, and horizontal member disposed between the first side member and the second side member, wherein a length of the top side is greater than a length of the rear side and a length of the front side;

a multifunctional handle disposed in the horizontal member;

wherein:

the collapsible pet crate comprises a deployed position and a collapsed position;

in the deployed position, the first side member and the second side member each extend from proximate the front top member to proximate the rear top member, and the top side is a first distance from the base; and in the collapsed position, the top side is a second distance from the base that is less than the first distance, the front side and the rear side are each positioned on the top side such that the top side is retained between the base and the front side and the rear side;

the multifunctional handle is rotatable while disposed in the horizontal member and comprises a mechanism that locks the collapsible pet crate in the deployed position; and the mechanism comprises at least one latch pin disposed within the horizontal member; wherein, in the deployed position, the at least one latch pin engages with at least one of the front side or the rear side; and wherein, in the collapsed position, the at least one latch pin disengages from the at least one of the front side or the rear side.

13. The collapsible pet crate of claim 12, wherein:

the front side is pivotably attached to the base such that the front side is positionable between the deployed position and the collapsed position via rotation about a front pivot;

the rear side is pivotably attached to the base such that the rear side is positionable between the deployed position and the collapsed position via rotation about a rear pivot; and in the collapsed position, the front top member of the front side is adjacent to but not touching the rear top member of the rear side and the top side is separated from the front top member and the rear top member.

14. The collapsible pet crate of claim 12, comprising:

a first side panel extending between the first side member and the base; and a second side panel extending between the second side member and the base.

15. The collapsible pet crate of claim 14, wherein:

in the deployed position, the first and second side panels are planer; and in the collapsed position, the first and second side panels are each folded about a hinge.

16. The collapsible pet crate of claim 12, wherein the front side comprises a hinged door configured to selectively cover an opening in the front side, and wherein the top comprises at least one opening for accessing an interior of the collapsible pet crate while in the deployed position.

17. The collapsible pet crate of claim 14, wherein the first side panel comprises a first side portion, a second side portion, and a hinge positioned between the first side portion and the second side portion, the first side panel being movable between an open configuration and a deployed configuration, and the first side portion being positioned at least partially between the top side and the second side portion in the open configuration.

* * * * *